United States Patent
Yamauchi et al.

(10) Patent No.: US 11,834,555 B2
(45) Date of Patent: Dec. 5, 2023

(54) CURED PRODUCT, MODIFIED CURED PRODUCT, AND CURING METHOD

(71) Applicant: Asahi Kasei Kabushiki Kaisha, Tokyo (JP)

(72) Inventors: Kazuhiro Yamauchi, Tokyo (JP); Tomohiro Sugahara, Tokyo (JP); Tatsuro Toda, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 150 days.

(21) Appl. No.: 17/432,179

(22) PCT Filed: Feb. 19, 2020

(86) PCT No.: PCT/JP2020/006612
§ 371 (c)(1),
(2) Date: Aug. 19, 2021

(87) PCT Pub. No.: WO2020/171136
PCT Pub. Date: Aug. 27, 2020

(65) Prior Publication Data
US 2022/0185964 A1 Jun. 16, 2022

(30) Foreign Application Priority Data

Feb. 20, 2019 (JP) ................. 2019-028637
Feb. 20, 2019 (JP) ................. 2019-028667
Feb. 20, 2019 (JP) ................. 2019-028719
Feb. 20, 2019 (JP) ................. 2019-028764

(51) Int. Cl.
*C08G 77/16* (2006.01)
*C08G 77/04* (2006.01)

(52) U.S. Cl.
CPC ........... *C08G 77/16* (2013.01); *C08G 77/045* (2013.01); *C09J 2203/326* (2013.01)

(58) Field of Classification Search
CPC ...................................... C08G 77/16
USPC ...................................... 528/37
See application file for complete search history.

(56) References Cited

U.S. PATENT DOCUMENTS

| 3,504,006 | A | 3/1970 | Modic |
| 6,340,735 | B1 | 1/2002 | Yagihashi |
| 8,883,951 | B2* | 11/2014 | Hwang ............... C08G 77/04 528/37 |
| 2003/0055195 | A1 | 3/2003 | Lee |
| 2005/0038220 | A1 | 2/2005 | Shin et al. |
| 2005/0080214 | A1* | 4/2005 | Shin ..................... C08G 77/50 528/10 |
| 2007/0088144 | A1 | 4/2007 | Kang et al. |
| 2013/0165617 | A1 | 6/2013 | Hwang et al. |
| 2016/0027975 | A1 | 1/2016 | Kitamura et al. |
| 2020/0369690 | A1 | 11/2020 | Yamauchi |

FOREIGN PATENT DOCUMENTS

| CN | 1104945055 A | 3/2020 |
| EP | 1493746 A2 | 1/2005 |
| GB | 1506734 A | 4/1978 |
| JP | 2000-281904 A | 10/2000 |
| JP | 2003-523423 A | 8/2003 |
| JP | 2005-023075 A | 1/2005 |
| JP | 2005-523377 A | 8/2005 |
| JP | 2006-279027 A | 10/2006 |
| JP | 2012-077008 A | 4/2012 |
| JP | 2015-182980 A | 10/2015 |
| JP | 2017-521872 A | 8/2017 |
| JP | 2019-137750 A | 8/2019 |
| KR | 10-2010-0131347 A | 12/2010 |
| WO | 2012/036510 A2 | 3/2012 |
| WO | 2018/101213 A1 | 6/2018 |

OTHER PUBLICATIONS

"The Grand Review II: Why Do Different Functional Groups Have Different Peak Heights and Widths" authored by Brian Smith and published in Spectroscopy (2021) 36(1) p. 9-15.*
"The Grand Review II: Why do Different Functional Groups have Different Peak Heights and Widths" authored by Brian Smith and published in Spectroscopy (2021) 36(1), p. 9-15 available at spectroscopyonline.com.*
Xiao et al., "Chemical Modification of the Surface of Poly(dimethylsiloxane) by Atom-Transfer Radical Polymerization of Acrylamide," Langmuir, 18: 9971-9976 (2002).
Pozdnyakova et al., "Cyclotetrasiloxanetetrols with Methyl Groups at Silicon: Isomers all-cis- and cis-trans-cis-[MeSi(O)OH]4," Inorganic Chemistry, 49 (2): 572-577 (2010).
International Search Report issued in corresponding International Patent Application No. PCT/JP2020/006612 dated Apr. 21, 2020.
Unno et al., "Synthesis of Ladder and Cage Silsequioxanes from 1,2,3,4-Tetrahydroxycyclotetrasiloxane," Bulletin of the Chemical Society of Japan, 73 (1): 215-220 (2000).
Supplementary European Search Report issued in related European Patent Application No. 20759027.4 dated Mar. 10, 2022.
International Preliminary Report on Patentability and Written Opinion issued in corresponding International Patent Application No. PCT/JP2020/006612 dated Sep. 2, 2021.

* cited by examiner

*Primary Examiner* — Marc S Zimmer
(74) *Attorney, Agent, or Firm* — Morgan, Lewis & Bockius LLP

(57) ABSTRACT

A cured product of a silanol composition comprising a cyclic silanol containing a silanol group and having a cyclic structure formed by a siloxane bond, and a dehydration condensation product thereof, wherein
an area ratio of a peak derived from SiO—H stretching observed at 2600 to 3800 cm$^{-1}$ to an area of a peak derived from Si—O—Si stretching observed at 960 to 1220 cm$^{-1}$ (SiO—H stretching/Si—O—Si stretching area ratio) is 0.01 or more in an IR spectrum.

25 Claims, 6 Drawing Sheets

CURED PRODUCT, MODIFIED CURED PRODUCT, AND CURING METHOD

TECHNICAL FIELD

The present invention relates to a cured product, a modified cured product, and a curing method.

BACKGROUND ART

Cyclic silanols are compounds containing silanol groups and having cyclic structures formed by siloxane bonds. Curable compositions comprising such compounds and dehydration condensation products of such compounds are used for the protection, sealing, and adhesion of semiconductor devices such as light-emitting diode devices. In addition, cyclic silanols can change or adjust the wavelength of light emitted from light-emitting diode devices and are used in applications such as lenses.

In recent years, cyclic silanols whose structures are precisely controlled have been reported. For example, in Non Patent Literature 1, tetrahydroxytetramethyltetracyclosiloxane in the all-cis form is disclosed.

CITATION LIST

Non Patent Literature

Non Patent Literature 1: Inorganic Chemistry Vol. 49, No. 2, 2010

SUMMARY OF INVENTION

Technical Problem

The present inventor has found that when a cured product of a silanol composition comprising the above cyclic silanol and a dehydration condensation product thereof is irradiated with light, the hydroxyl group density (silanol group density) in the cured product can be increased, and the reactivity is excellent. However, a problem is that when a cured product of a curable composition comprising the tetrahydroxytetramethyltetracyclosiloxane in the all-cis form disclosed in Non Patent Literature 1 is irradiated with light, cracks accompanying structural change occur.

Accordingly, it is an object of the present invention to provide a cured product excellent in crack resistance during light irradiation.

Solution to Problem

The present inventors have diligently pursued studies in order to solve the above problem, and as a result found that when a silanol composition comprising a cyclic silanol and a dehydration condensation product of the cyclic silanol is cured so that the area ratio of the peak derived from SiO—H stretching observed at 2600 to 3800 $cm^{-1}$ to the area of the peak derived from Si—O—Si stretching observed at 960 to 1220 $cm^{-1}$ ((SiO—H stretching/Si—O—Si stretching area ratio) is within a predetermined range, a cured product excellent in crack resistance during light irradiation is obtained.

In addition, the present inventors have found that when a silanol composition comprising a cyclic silanol and a dehydration condensation product of the cyclic silanol is cured so as to have a peak top in the range of 470 $cm^{-1}$ or more and 600 $cm^{-1}$ in the Raman spectrum, a cured product excellent in crack resistance during light irradiation is obtained.

In addition, the present inventors have found that when a silanol composition comprising a cyclic silanol and a dehydration condensation product of the cyclic silanol is cured so that the hardness is within a predetermined range, a cured product excellent in crack resistance during light irradiation is obtained.

The present inventors have found that when a silanol composition comprising a cyclic silanol and a dehydration condensation product of the cyclic silanol is cured so that the film thickness is within a predetermined range, a cured product excellent in adhesiveness, and crack resistance during light irradiation is obtained.

Further, the present inventors have found that the crack resistance is excellent in a cured product comprising a dehydration condensation product of a silanol formed by a siloxane bond, wherein the peak wave number of Si—OH stretching vibration is 940 $cm^{-1}$ or more and 960 $cm^{-1}$ or less in the IR spectrum, and the amount of functional groups defined by "0.1*a+b" (a and b are respectively the peak height of the Si—OH stretching vibration observed at 920±50 $cm^{-1}$ and the peak height of Si-methyl stretching vibration observed at 1270±10 $cm^{-1}$ when the peak height of Si—C—Si stretching vibration at 1030±40 $cm^{-1}$ is defined as 1) is 0 or more and 0.05 or less.

Specifically, the present invention is as follows.

[1]

A cured product of a silanol composition comprising a cyclic silanol containing a silanol group and having a cyclic structure formed by a siloxane bond, and a dehydration condensation product thereof, wherein an area ratio of a peak derived from SiO—H stretching observed at 2600 to 3800 $cm^{-1}$ to an area of a peak derived from Si—O—Si stretching observed at 960 to 1220 $cm^{-1}$ (SiO—H stretching/Si—C—Si stretching area ratio) is 0.01 or more in an IR spectrum.

[2]

The cured product according to the above [1], wherein the SiO—H stretching/Si—O—Si stretching area ratio is 1.0 or less.

[3]

A cured product of a silanol composition comprising a cyclic silanol containing a silanol group and having a cyclic structure formed by a siloxane bond, and a dehydration condensation product thereof, having a peak top in a range of 470 $cm^{-1}$ or more and 600 $cm^{-1}$ in a Raman spectrum.

[4]

A cured product of a silanol composition comprising a cyclic silanol containing a silanol group and having a cyclic structure formed by a siloxane bond, and a dehydration condensation product thereof, having a hardness of 0.01 GPa or more and 1 GPa or less.

[5]

The cured product according to the above [4], having a Young's modulus of 0.1 GPa or more.

[6]

The cured product according to the above [4] or [5], having a Young's modulus of 30 GPa or less.

[7]

A cured product of a silanol composition comprising a cyclic silanol containing a silanol group and having a cyclic structure formed by a siloxane bond, and a dehydration condensation product thereof, having a film thickness of 0.01 μm or more and 2 μm or less.

[8]

The cured product according to any of the above [1] to [7], wherein the cyclic silanol and dehydration condensation product thereof are a cyclic silanol (A1) represented by the following formula (1) and a dehydration condensation product thereof (A2),

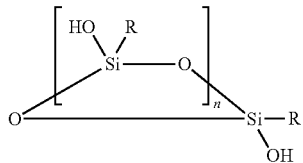

(1)

wherein each R is independently a fluorine atom, an aryl group, a vinyl group, an allyl group, a fluorine-substituted linear or branched alkyl group having 1 to 4 carbon atoms, or an unsubstituted linear or branched alkyl group having 1 to 4 carbon atoms, and n is an integer of 2 to 10.

[9]

The cured product according to the above [8], wherein the cyclic silanol (A1) represented by the formula (1) and the dehydration condensation product thereof (A2) are a cyclic silanol (A10) represented by the following formula (10) and a dehydration condensation product thereof (A20),

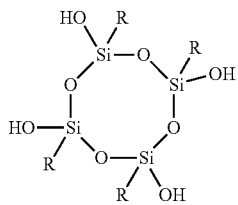

(10)

wherein R has the same meaning as R in the formula (1).

[10]

The cured product according to the above [9], wherein the cyclic silanol (A10) contains cyclic silanols (B1) to (B4) represented by the following formulas (2) to (5):

(B1)

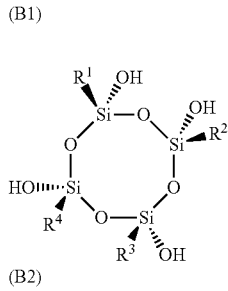

(2)

(B2)

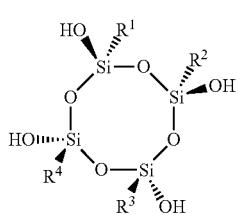

(3)

(B3)

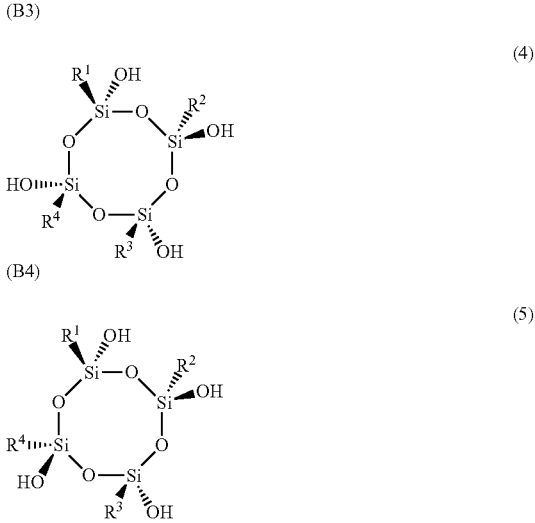

(4)

(B4)

(5)

wherein $R^1$ to $R^4$ are each independently a fluorine atom, an aryl group, a vinyl group, an allyl group, a fluorine-substituted linear or branched alkyl group having 1 to 4 carbon atoms, or an unsubstituted linear or branched alkyl group having 1 to 4 carbon atoms, and $0 < b \le 20$ is satisfied when a proportion (mol %) of the cyclic silanol (B2) to a total amount of the cyclic silanols (B1) to (B4) is b.

[11]

The cured product according to any of the above [8] to [10], wherein an area of the dehydration condensation product (A2) is more than 0% and 50% or less based on a total area of the cyclic silanol (A1) and the dehydration condensation product (A2) in gel permeation chromatography measurement.

[12]

The cured product according to any of the above [1] to [11], wherein a proportion of a transition metal in the silanol composition is less than 1 ppm by mass.

[13]

The cured product according to any of the above [1] to [12], wherein the silanol composition comprises a solvent.

[14]

The cured product according to any of the above [1] to [13], used for an adhesive.

[15]

A modified cured product obtained by irradiating the cured product according to any of the above [1] to [14] with light.

[16]

The modified cured product according to the above [15], wherein the cyclic silanol and dehydration condensation product thereof are the cyclic silanol (A1) represented by the formula (1) and the dehydration condensation product thereof (A2), and the modified cured product comprising a site in which a conversion rate of groups represented by R in the formula (1) into hydroxyl groups is 100%.

[17]

A method for curing a silanol composition, comprising a step of thermally curing under a temperature condition of 25 to 200° C. a silanol composition comprising a cyclic silanol containing a silanol group and having a cyclic structure formed by a siloxane bond, and a dehydration condensation product thereof.

[18]

The curing method according to the above [17], wherein the silanol composition is thermally cured for 10 min to 48 h in the thermal curing step.

[19]

A cured product comprising a dehydration condensation product of a silanol formed by a siloxane bond, wherein
a peak wave number of Si—OH stretching vibration is 940 cm$^{-1}$ or more and 960 cm$^{-1}$ or less in an IR spectrum, and an amount of functional groups defined by "0.1*a+b" (a and b are respectively a peak height of the Si—OH stretching vibration observed at 920±50 cm$^{-1}$ and a peak height of Si-methyl stretching vibration observed at 1270±10 cm$^{-1}$ when a peak height of Si—O—Si stretching vibration at 1030±40 cm$^{-1}$ is defined as 1) is 0 or more and 0.05 or less.

[20]

The cured product according to the above [19], wherein the peak wave number of the Si—OH stretching vibration is 940 cm$^{-1}$ or more and 950 cm$^{-1}$ or less.

[21]

The cured product according to the above [19] or [20], wherein the amount of functional groups defined by "0.1*a+b" is 0 or more and 0.04 or less.

[22]

The cured product according to any of claims [19] to [21], having a peak at 470 cm$^{-1}$ or more and 510 cm$^{-1}$ or less in a Raman spectrum.

[23]

The cured product according to any of the above [19] to [21], having a peak at 480 cm$^{-1}$ or more and 500 cm$^{-1}$ or less in a Raman spectrum.

[24]

The cured product according to any of the above [19] to [23], having a hardness of 1.5 GPa or more.

[25]

The cured product according to any of the above [19] to [23], having a hardness of 2.0 GPa or more.

Advantageous Effect of Invention

According to the present invention, a cured product excellent in crack resistance during light irradiation can be provided.

DESCRIPTION OF EMBODIMENT

Figure 1:
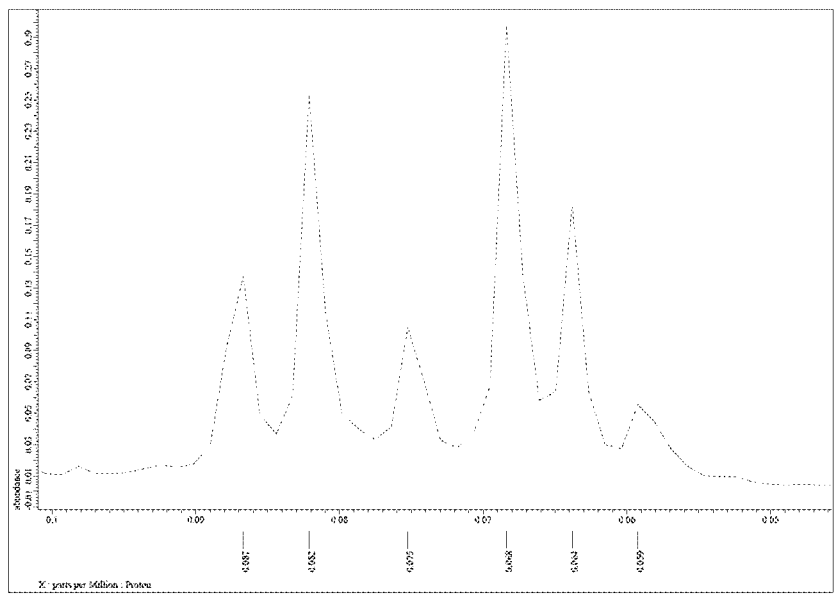
FIG. 1 is a diagram showing the $^1$H-NMR spectrum used when calculating the proportions of the stereoisomers of the silanol composition obtained in Example 1-1.

A mode for carrying out the present invention (hereinafter also referred to as "this embodiment") will be described in detail below. The present invention is not limited to this embodiment, and various modifications can be made without departing from the spirit thereof.

First Embodiment

The cured product in the first embodiment of the present invention (hereinafter also referred to as "this embodiment 1") is
a cured product of a silanol composition comprising a cyclic silanol containing a silanol group and having a cyclic structure formed by a siloxane bond, and a dehydration condensation product thereof, wherein
the ratio of the area of the peak derived from SiO—H stretching observed at 2600 to 3800 cm$^{-1}$ to the area of the peak derived from Si—O—Si stretching observed at 960 to 1220 cm$^{-1}$ (SiO—H stretching/Si—O—Si stretching area ratio) is 0.01 or more in the IR spectrum.

(Silanol Composition)

The cyclic silanol and the dehydration condensation product thereof are preferably a cyclic silanol (A1) represented by formula (1) and a dehydration condensation product of the cyclic silanol (A2).

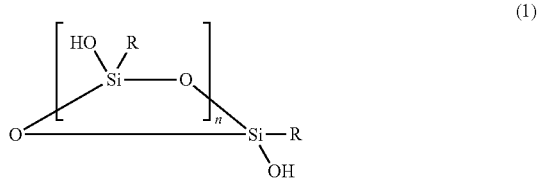

(1)

wherein each R is independently a fluorine atom, an aryl group, a vinyl group, an allyl group, a fluorine-substituted linear or branched alkyl group having 1 to 4 carbon atoms, or an unsubstituted linear or branched alkyl group having 1 to 4 carbon atoms, and n is an integer of 2 to 10.

Examples of the aryl group include a phenyl group and a naphthyl group, and a phenyl group is preferred from the viewpoint of thermal decomposition resistance.

Examples of the fluorine-substituted linear or branched alkyl group having 1 to 4 carbon atoms in this embodiment include the following groups:

$CF_3$—,
$CF_3CF_2$—,
$CF_3CF_2CF_2$—,
$(CF_3)_2CF$—,
$CF_3CF_2CF_2CF_2$—,
$HCF_2CF_2CF_2CF_2$—,
$(CF_3)_2CFCF_2$—

Among the above, linear fluoroalkyl chains are preferred from the viewpoint of thermal decomposition resistance.

Examples of the unsubstituted linear or branched alkyl group having 1 to 4 carbon atoms include methyl, ethyl, n-propyl, isopropyl, n-butyl, isobutyl, and tert-butyl, and among them, a methyl group or an ethyl group is preferred from the viewpoint of thermal decomposition resistance.

n is an integer of 2 to 10, preferably an integer of 3 to 6, more preferably an integer of 4 to 5, and particularly preferably 4.

The silanol composition in this embodiment preferably has a haze of 10% or less. When the haze of the silanol composition is 10% or less, the transparency when the silanol composition is formed into a cured product tends to be high, and the adhesive force tends to be excellent. The haze here refers to the haze when the silanol composition is dried by a method in Examples described later to a film thickness of 3 μm.

Examples of the method for setting the haze in the silanol composition at 10% or less include a method of adjusting the proportions of the isomers in the cyclic silanol (A1) represented by formula (1) to decrease the proportions of the isomers having high crystallinity, and a method of reducing the amount of a transition metal contained in the silanol composition.

The haze of the silanol composition is preferably 5% or less, more preferably 2% or less, and further preferably 1% or less.

The haze of the silanol composition can be specifically measured by a method described in Examples.

The silanol composition in this embodiment preferably comprises the dehydration condensation product (A2) of the cyclic silanol represented by formula (1). The dehydration condensation product (A2) of the cyclic silanol represented by formula (1) is a compound obtained by a reaction in which at least one of the silanol groups of a cyclic silanol represented by formula (1) undergoes dehydration condensation with at least one silanol group in at least one another cyclic silanol molecule represented by formula (1) to form a siloxane bond.

The cyclic silanol (A1) represented by formula (1) and the dehydration condensation product of the cyclic silanol (A2) in this embodiment are more preferably a cyclic silanol (A10) represented by the following formula (10) and a dehydration condensation product of the cyclic silanol (A20).

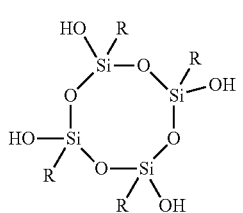

(10)

wherein R has the same meaning as R in the formula (1).

The dehydration condensation product of the cyclic silanol represented by formula (10), for example, can be schematically represented by the following formula (7):

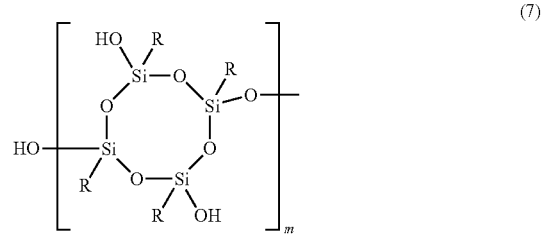

(7)

wherein R has the same meaning as R in the formula (1), and m is an integer of 2 or more. The silanol group in the cyclic silanol that undergoes dehydration condensation may be any silanol group. At this time, in the dehydration condensation product represented by formula (7), two or more siloxane bonds may be formed between two or more molecules of cyclic silanol structures.

Specific examples of the dehydration condensation product of the cyclic silanol represented by formula (10) include the following compounds. However, the dehydration condensation product of the cyclic silanol represented by formula (10) is not limited to the following compounds.

The orientation of the hydroxy groups (—OH) and the R groups with respect to the cyclic silanol skeletons in the following compounds is not limited. Each R in the following compounds independently has the same meaning as R in formula (1).

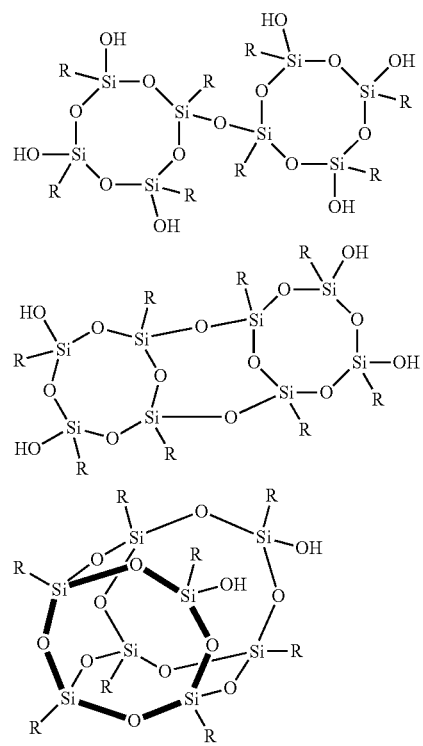

-continued

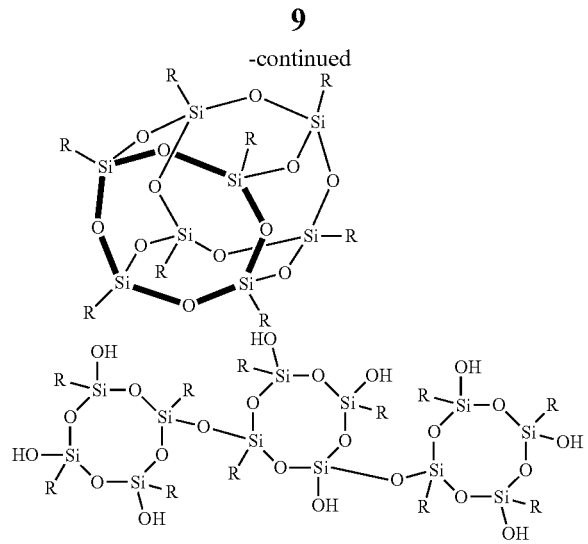

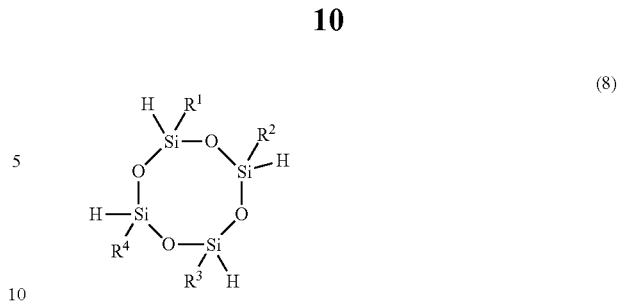

(8)

wherein $R^1$ to $R^4$ are each independently a fluorine atom, an aryl group, a vinyl group, an allyl group, a fluorine-substituted linear or branched alkyl group having 1 to 4 carbon atoms, or an unsubstituted linear or branched alkyl having 1 to 4 carbon atoms.

Here, specific examples of the substituents for $R^1$ to $R^4$ are the same as the specific examples of the substituents represented by R in formula (1).

Specific examples of the cyclic hydrosilane compound include tetramethyltetracyclosiloxane.

Generally, the cyclic hydrosilane compound has no hydroxy or alkoxy functional groups, but such functional groups may be contained in a certain amount before an oxidation reaction.

Examples of the method for oxidizing the hydrosilane compound include a method using a catalyst and/or an oxidant.

As the catalyst, for example, metal catalysts such as Pd, Pt, and Rh can be used. One of these metal catalysts may be used alone, or two or more of these metal catalysts may be used in combination. These metal catalysts may be supported on supports such as carbon.

As the oxidant, for example, peroxides can be used. As the peroxides, any can be used, and examples thereof include oxiranes such as dimethyldioxirane.

As the method for oxidizing the hydrosilane compound, Pd/carbon is preferably used from the viewpoint of reactivity, and the ease of catalyst removal after the reaction.

The cyclic silanol prepared by oxidizing the hydrosilane compound in the presence of water or an alcohol has a cyclic structure and therefore comprises various isomers derived from the cis and trans of the hydrogen atoms of the SiH groups of the starting material.

The cyclic hydrosilane compound represented by the formula (8) is obtained by the hydrolysis of chlorosilane or the equilibration polymerization reaction of polymethylsiloxane. It is difficult to control the proportions of isomers derived from cis and trans, and therefore various isomers derived from cis and trans are mixed in the cyclic hydrosilane compound. The cis and trans of the cyclic hydrosilane compound in this embodiment respectively indicate that the orientation of adjacent two hydroxy groups or adjacent two R groups with respect to the cyclic siloxane skeleton is the same (cis), and that the orientation of adjacent two hydroxy groups or adjacent two R groups with respect to the cyclic siloxane skeleton is different (trans).

Examples of the isomers contained in the cyclic silanol produced by the above-described oxidation reaction include an all-cis cyclic silanol (B1) represented by the following formula (2). In the all-cis cyclic silanol (B1), all hydroxy groups and $R^1$ to $R^4$ groups are each arranged in the same direction with respect to the cyclic siloxane skeleton, as shown by formula (2).

The dehydration condensation product of the cyclic silanol represented by formula (10) preferably has a molecular weight of 500 to 1,000,000, more preferably 500 to 100,000, and further preferably 500 to 10,000 as calculated by gel permeation chromatography measurement.

In the silanol composition in this embodiment, the area of the dehydration condensation product (A2) is preferably more than 0% and 50% or less based on the total area of the cyclic silanol (A1) and the dehydration condensation product (A2) in gel permeation chromatography measurement. The area of each compound obtained by gel permeation chromatography measurement represents the content of each compound in the silanol composition. When the area of (A2) is more than 0% and 50% or less, the viscosity tends not to be too high, and an organic solvent and water tend to be easily removed from the silanol composition comprising the organic solvent and water, when the silanol composition is produced. The area of (A2) is more preferably more than 0% and 40% or less, further preferably more than 0% and 25% or less.

The area of the dehydration condensation product (A2), that is, the content of the dehydration condensation product (A2), can be controlled, for example, by purification after an oxidation reaction when a hydrosilane compound is oxidized in the production of the silanol composition to obtain the cyclic silanol. The measurement of the areas of (A1) and (A2), that is, the content of (A1) and (A2), by gel permeation chromatography can be specifically performed by a method described in Examples.

The silanol composition in this embodiment can be prepared, for example, by oxidizing a hydrosilane compound in the presence of water or an alcohol. For the hydrosilane compound (for example, a cyclic hydrosilane compound having a cyclic structure), any tetrasubstituted tetracyclosiloxane containing hydrogen can be used, and commercial products can be used.

The hydrosilane compound is preferably a tetrasubstituted tetracyclosiloxane represented by the following formula (8):

(B1)

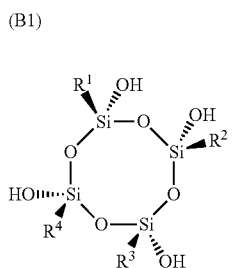

(2)

wherein $R^1$ to $R^4$ are each independently a fluorine atom, an aryl group, a vinyl group, an allyl group, a fluorine-substituted linear or branched alkyl having 1 to 4 carbon atoms, or an unsubstituted linear or branched alkyl having 1 to 4 carbon atoms.

Here, specific examples of the substituents for $R^1$ to $R^4$ are the same as the specific examples of the substituents represented by R in formula (1).

Due to the all-cis cyclic silanol (B1) represented by formula (2), the cyclic silanol synthesized from the cyclic hydrosilane compound by the oxidation reaction tends to cloud. This phenomenon is considered to be due to the fact that the all-cis cyclic silanol (B1) has crystallinity, and is significant particularly during storage and in the case of freezing and storage at −30° C. By removing a cyclic silanol having high crystallinity, the silanol is prevented from crystallizing and precipitating in the silanol composition, a silanol composition having high transparency is obtained, and a cured product having high transparency can also be obtained. In addition, by removing a cyclic silanol having high crystallinity, the adhesive force of the silanol composition improves.

From the viewpoint of obtaining a silanol composition having high transparency, the proportion of the cyclic silanol (B1) is preferably reduced.

Examples of the method for reducing the proportion of the cyclic silanol (B1) include a method combining a recrystallization operation and the removal of crystals.

More specifically, by adding a poor solvent to a good solvent solution of the product obtained in the synthesis of the cyclic silanol, the cyclic silanol (B1) precipitates as crystals. By removing the precipitated cyclic silanol (B1) and concentrating the solution of the soluble portion, the proportion of the cyclic silanol (B1) in the silanol composition is reduced, and a silanol composition having high transparency can be obtained.

When the recrystallization operation is performed, the cooling temperature is preferably less than 10° C. from the viewpoint of obtaining a silanol composition having high transparency. From the viewpoint of the improvement of the yield of the cyclic silanol, the amount (volume) of the poor solvent is preferably equal to or more than the amount of the good solvent and 20 times or less.

Examples of the good solvent include tetrahydrofuran, diethyl ether, acetone, methanol, ethanol, isopropanol, dimethylformamide, dimethyl sulfoxide, glycerin, ethylene glycol, and methyl ethyl ketone. One of these good solvents may be used alone, or two or more of these good solvents may be used in combination.

Examples of the poor solvent include toluene, chloroform, hexane, dichloromethane, and xylene. One of these poor solvents may be used alone, or two or more of these poor solvents may be used in combination.

The proportion of the cyclic silanol (B1) can be calculated by subjecting the cyclic silanol obtained by the synthesis to $^1$H-NMR measurement. Specifically, in $^1$H-NMR measurement, the hydrogen contained in the $R^1$ to $R^4$ groups of the cyclic silanol (B1) is observed on the highest magnetic field side with respect to the hydrogen in the $R^1$ to $R^4$ groups of other isomers of the cyclic silanol. Therefore, the proportion of the cyclic silanol (B1) is calculated from the integral values of these hydrogens.

When a metal catalyst is used in the oxidation of the hydrosilane compound, the transition metal contained in the metal catalyst remains in the insoluble matter residue by the above-described recrystallization operation, and therefore the proportion of the transition metal in the filtrate can be reduced by the operation of removing the crystals. Therefore, the coloration of the silanol derived from the remaining of the metal catalyst can also be reduced by the operation for removing the cyclic silanol represented by formula (2).

From the viewpoint of increasing the light transmission properties of the silanol composition, the proportion of the transition metal is preferably less than 10 ppm by mass, more preferably less than 5 ppm by mass, and further preferably less than 1 ppm by mass based on the total weight of the silanol composition.

The proportion of the transition metal can be specifically measured by a method described in Examples.

Examples of the transition metal include palladium.

When oxidation is performed using, for the starting material, the tetrasubstituted tetracyclosiloxane represented by formula (8) as the hydrosilane compound, cyclic silanols (B1) to (B4) represented by the following formulas (2) to (5) may be mixed in the obtained tetrahydroxy-tetrasubstituted tetracyclosiloxane, and the tetrahydroxy-tetrasubstituted tetracyclosiloxane preferably comprises the cyclic silanols (B1) to (B4).

(B1)

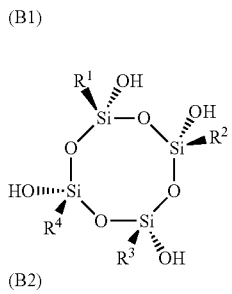

(2)

(B2)

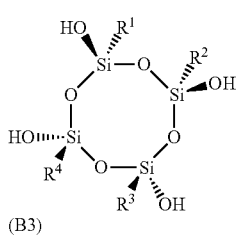

(3)

(B3)

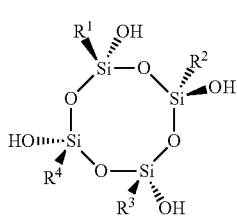

(4)

(B4)

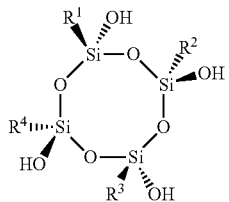

(5)

wherein $R^1$ to $R^4$ are each independently a fluorine atom, an aryl group, a vinyl group, an allyl group, a fluorine-substituted linear or branched alkyl group having 1 to 4 carbon atoms, or an unsubstituted linear or branched alkyl group having 1 to 4 carbon atoms.

It is preferred that the cyclic silanol (A1) in this embodiment contains the cyclic silanols (B1) to (B4) represented by the following formulas (2) to (5), and 0<b≤20 is satisfied when the proportion (mol %) of the cyclic silanol (B2) to the total amount of the cyclic silanols (B1) to (B4) is b.

Examples of the method for setting the proportion b at 0<b≤20 include a method combining a recrystallization operation and the removal of crystals, as described above.

When oxidation is performed using, for the starting material, tetramethyltetracyclosiloxane as the hydrosilane compound, six types of peaks of four types of isomers are observed (here, three types of peaks are observed for trans-trans-cis) when the $^1$H-NMR of the obtained tetrahydroxytetramethyltetracyclosiloxane is measured. The hydrogen in the $R^1$ to $R^4$ groups is observed in the order of all-cis (cyclic silanol (B1)), trans-trans-cis (cyclic silanol (B3)), trans-trans-cis (cyclic silanol (B3)), cis-trans-cis (cyclic silanol (B2)), all-trans (cyclic silanol (B4)), and trans-trans-cis (cyclic silanol (B3)) types from the high magnetic field side, and therefore from the integral values of such hydrogen, the respective proportions of the cyclic silanols (B1) to (B4) are calculated.

The cyclic silanol (B2) represented by formula (3) also has crystallinity, and therefore when a good solvent is used for the reaction solution, the cyclic silanol (B2) precipitates as crystals by adding a poor solvent. Due to the cyclic silanol (B2), the synthesized cyclic silanol (A1) tends to cloud. This phenomenon is considered to be due to the fact that the cis-trans-cis cyclic silanol (B2) has crystallinity, and is significant particularly during storage and in the case of freezing and storage at −30° C.

From the viewpoint of obtaining a silanol composition having high transparency, the proportion of the cyclic silanol (B2) is preferably 0% to 50%, more preferably 0% to 40%, further preferably 0 to 35%, and still further preferably 0% or more and less than 35% with respect to the cyclic silanol represented by formula (1).

The silanol composition in this embodiment 1 is preferably produced by oxidizing a hydrosilane compound in the presence of water or an alcohol to prepare a cyclic silanol, adding a poor solvent to a good solvent solution of the product obtained in the synthesis of the cyclic silanol, to perform recrystallization, performing filtration, and concentrating the solution of the soluble portion obtained by the filtration, as described above.

In the production of the silanol composition in this embodiment 1, the concentration of the solution of the soluble portion should be optionally performed, and the solution of the soluble portion itself may be used as the silanol composition. In addition, in the concentration of the solution of the soluble portion, it is not necessary to remove all the solvent contained in the solution, and therefore the silanol composition in this embodiment 1 may be a crude concentrate obtained by distilling off some of the solvent contained in the solution of the soluble portion. Further, the silanol composition in this embodiment may be one obtained by concentrating the solution of the soluble portion and then rediluting the concentrate with a solvent. As described above, one preferred mode of this embodiment is a silanol composition comprising a solvent.

The amount of the solvent in the silanol composition comprising the solvent is not particularly limited but is preferably 95% by mass or less, more preferably 90% by mass or less, and further preferably 85% by mass or less based on the total amount of the silanol composition. The lower limit value of the amount of the solvent is not particularly limited but is usually 1% by mass or more. Examples of the solvent in the silanol composition comprising the solvent include the water and/or the alcohol used in the reaction, and the good solvent and the poor solvent used during the recrystallization. Specific examples of the solvent include, but are not limited to, water, tetrahydrofuran, diethyl ether, acetone, methanol, ethanol, isopropanol, dimethylformamide, dimethyl sulfoxide, glycerin, ethylene glycol, methyl ethyl ketone, toluene, chloroform, hexane, dichloromethane, and xylene. These solvents may each be one alone or may be a combination of two or more.

[Cured Product]

The cured product in this embodiment 1 is a cured product of a silanol composition comprising a cyclic silanol and a dehydration condensation product thereof, wherein the area ratio of the peak derived from SiO—H stretching observed at 2600 to 3800 cm$^{-1}$ to the area of the peak derived from Si—O—Si stretching observed at 960 to 1220 cm$^{-1}$ (SiO—H stretching/Si—O—Si stretching area ratio) is 0.01 or more in the IR spectrum.

The cured product in this embodiment 1 is obtained by forming siloxane bonds (—Si—O—Si—) by the dehydration condensation reaction of silanol groups (—Si—OH) contained in the cyclic silanol and the dehydration condensation product thereof in the silanol composition. The cured product in this embodiment 1 is insoluble in solvents such as tetrahydrofuran and toluene.

The cured product in this embodiment 1 is excellent in crack resistance during light irradiation when the proportions of the silanol group (—Si—OH) density and the siloxane group (—Si—C—Si—) density in the cured product are within predetermined ranges.

The area ratio of the peak derived from the SiO—H stretching observed at 2600 to 3800 cm$^{-1}$ to the area of the peak derived from the Si—O—Si stretching observed at 960 to 1220 cm$^{-1}$ (SiO—H stretching/Si—O—Si stretching area ratio) in the cured product in this embodiment 1 is 0.01 or more, preferably 0.1 or more and 1.0 or less, more preferably 0.2 or more and 0.9 or less, further preferably 0.2 or more and 0.8 or less, and particularly 0.3 or more and 0.7 or less. When the SiO—H stretching/Si—O—Si stretching area ratio is 0.01 or more, the crack resistance during light irradiation is excellent. On the other hand, the upper limit is not particularly limited, but when the upper limit is 1.0 or less, the fluidity tends to be lost, and the form of the cured product tends to be able to be sufficiently maintained.

In the cured product in this embodiment 1, the area ratio of the peak derived from Si-methyl stretching observed at 1220 to 1320 cm$^{-1}$ to the area of the peak derived from the Si—O—Si stretching observed at 960 to 1220 cm$^{-1}$ (Si-methyl stretching/Si—O—Si stretching area ratio) may be 0 or more and is preferably more than 0 and 1.0 or less, more preferably 0.1 or more and 0.9 or less, and further preferably 0.2 or more and 0.8 or less, in the IR spectrum. When the Si-methyl stretching/SiOSi stretching area ratio is more than 0, the crack resistance when the cured product is used in a form in which large stress is applied to the cured product (for example, a three-layer structure of glass/cured product/glass or glass/cured product/semiconductor) tends to be excellent. When the Si-methyl stretching/SiOSi stretching area ratio is 1.0 or less, the crack resistance during light irradiation tends to be excellent.

The SiO—H stretching/Si—O—Si stretching area ratio and Si-methyl stretching/Si—O—Si stretching area ratio of the cured product can each be measured according to a method described in Examples described later.

The haze of the cured product in this embodiment 1 is preferably 10% or less. When the haze of the silanol cured product is 10% or less, the transparency and the adhesiveness tend to be even better.

Examples of the method for setting the haze of the cured product at 10% or less include a method of adjusting the proportions of the isomers in the cyclic silanol (A1) represented by formula (1) to decrease the proportions of the isomers having high crystallinity, and a method of reducing the amounts of metals contained in the silanol composition.

The haze of the cured product is preferably 5% or less, more preferably 2% or less, and further preferably 1% or less.

The haze of the cured product can be specifically measured by a method described in Examples.

The cyclic silanol may be cured (subjected to dehydration condensation) in the absence of a catalyst or may be cured by adding a catalyst.

The catalyst used in the curing of the cyclic silanol has the action of promoting the hydrolysis and condensation reactions of the cyclic silanol. As the catalyst, an acid catalyst or an alkali catalyst can be used.

The acid catalyst is not particularly limited, and preferred examples thereof include hydrochloric acid, nitric acid, sulfuric acid, phosphoric acid, hydrofluoric acid, formic acid, acetic acid, propionic acid, butyric acid, valeric acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, oleic acid, methylmalonic acid, adipic acid, p-aminobenzoic acid, and p-toluenesulfonic acid.

The alkali catalyst is not particularly limited, and preferred examples thereof include sodium hydroxide, potassium hydroxide, sodium hydrogen carbonate, sodium carbonate, ammonium carbonate, ammonium hydrogen carbonate, ammonia water and organic amines. When an inorganic base is used, a composition for forming an insulating film comprising no metal ions is used.

For each of the acid catalyst and the alkali catalyst, one may be used alone, or two or more may be used in combination.

The amount of the catalyst added can be adjusted according to the reaction conditions and is preferably 0.000001 to 2 mol based on 1 mol of the hydroxyl groups of the cyclic silanol. When the amount added is more than 2 mol based on 1 mol of the hydroxyl groups of the cyclic silanol, the reaction rate is very fast even at low concentration and therefore the adjustment of molecular weight tends to be difficult, and a gel tends to form easily.

When the cured product is obtained, the silanol composition can be subjected to hydrolysis and condensation reactions in stages by using an acid catalyst and an alkali catalyst. Specifically, the cured product can be obtained by subjecting the silanol composition to hydrolysis and condensation reactions with an acid, followed by reactions with a base again, or first subjecting the silanol composition to hydrolysis and condensation reactions with a base, followed by reactions with an acid again. In addition, it is also possible to react the silanol compositions with an acid catalyst and an alkali catalyst respectively and then mix the condensation products for use as the silanol composition.

[Curing Method]

One mode of this embodiment 1 is a method for curing a silanol composition comprising a cyclic silanol and a dehydration condensation product thereof. Examples of the method for curing the silanol composition in this embodiment 1 include thermally curing the silanol composition. The temperature (curing temperature) when the silanol composition is thermally cured is not particularly limited but is preferably 25 to 200° C., more preferably 50 to 200° C., further preferably 75 to 180° C., and particularly preferably 100 to 150° C. By setting the curing temperature within the above range, the proportion of the residual silanol groups in the cured product can be controlled, and therefore the silanol group/SiOSi group area ratio can be set at the desired value.

The time of thermally curing the silanol composition is preferably 10 min to 72 h, more preferably 30 min to 48 h, further preferably 1 to 24 h, and particularly preferably 1 to 12 h. By setting the curing temperature within the above range, the proportion of the residual silanol groups in the cured product can be ever more controlled, and therefore the silanol group/SiOSi group area ratio can be set at the desired value. However, in order to set the silanol group/SiOSi group area ratio at the desired value, the curing temperature should be set within the above range, and it is not always necessary to set the curing time within the above range.

The silanol groups can be detected by IR, and the silanol group/SiOSi group peak area integral ratio and the crack resistance during light irradiation correlate with each other.

[Adhesive]

The cured product in this embodiment 1 can be used as an adhesive. An example of use as an adhesive will be described below. That is, first, the silanol composition in this embodiment 1 is applied to a base material to form an adhesive layer on the base material. Next, the adhesive layer is cured, and thus a cured product is formed. This cured product corresponds to an adhesive. Examples of the base material include glass, silicon wafers, $SiO_2$ wafers, SiN wafers, and compound semiconductors.

[Modified Cured Product]

The modified cured product in this embodiment 1 is obtained by irradiating the cured product in this embodiment 1 with light. Thus, the monovalent groups (for example, R represented by formula (1) when the cyclic silanol is the cyclic silanol (A1) represented by formula (1)) contained in the cured product are converted into hydroxyl groups, and therefore the hydroxyl group density (silanol group density) in the cured product can be increased. The obtained modified cured product is excellent in reactivity. Here, when a cured product comprising a cyclic silanol is irradiated with light, cracking tends to occur, but as described above, even if the cured product in this embodiment is irradiated with light, cracks are less likely to be caused. Therefore, the modified cured product has the characteristics of suppressed occurrence of cracks and excellent reactivity.

In the modified cured product in this embodiment 1, the cyclic silanol and the dehydration condensation product thereof are preferably the cyclic silanol (A1) represented by the above formula (1) and the dehydration condensation product thereof (A2). In this case, the modified cured product preferably comprises a site in which the conversion rate of the groups represented by R in the above formula (1) into hydroxyl groups is 100% (completely converted site). In the modified cured product, the conversion rate into hydroxyl groups is preferably 100% on its entire surface (all). However, even if the cured product is irradiated with light using the usual light irradiation apparatus, the intensity of irradiation light is different depending on the sites, and therefore it is difficult to set the conversion rate into hydroxyl groups at 100% on the entire surface. Therefore, usually, in the modified cured product, a site in which the groups represented by R are converted into hydroxyl groups, and a site in which the groups represented by R are not converted into hydroxyl groups are present even if the modified cured product is irradiated with light over the front surface.

That is, the modified cured product in this embodiment 1 comprises a site in which the conversion rate of the groups represented by R in the above formula (1) into hydroxyl groups is 100%, and thus tends to be a better material from the viewpoint of stability to heat, light, and impact.

The modified cured product is obtained by irradiating the cured product with light. Examples of the light source when the cured product is irradiated with light include lasers, LEDs, and lamps. Light irradiation may be performed in the presence of ozone using a commercial apparatus such as SEN LIGHTS CORPORATION PL17-110.

The wavelength of light when the cured product is irradiated with light is preferably 10 nm or more and 400 nm or less, more preferably 200 nm or more and 300 nm or less. When the wavelength of light when the cured product is irradiated with light is within the above range, the occurrence of cracks due to the photolysis of the silicon-methyl groups can be suppressed, and therefore the crack resistance effect of the residual silanol tends to be significant.

Second Embodiment

The cured product in this embodiment 2 is
a cured product of a silanol composition comprising a cyclic silanol containing a silanol group and having a cyclic structure formed by a siloxane bond, and a dehydration condensation product thereof,
having a peak top in the range of 470 cm$^{-1}$ or more and 600 cm$^{-1}$ in the Raman spectrum.

Here, the cyclic silanol containing a silanol group and having a cyclic structure formed by a siloxane bond, and the dehydration condensation product thereof contained in the silanol composition are not particularly limited, and examples thereof include the cyclic silanol (A1) represented by formula (1) and the dehydration condensation product of the cyclic silanol (A2) described above. In this case, the cured product in this embodiment 2 is obtained by forming siloxane bonds (—Si—O—Si—) by the dehydration condensation reaction of silanol groups (—Si—OH) contained in the cyclic silanol and the dehydration condensation product thereof.

The silanol composition in this embodiment 2 is preferably produced by oxidizing a hydrosilane compound in the presence of water or an alcohol to prepare a cyclic silanol, adding a poor solvent to a good solvent solution of the product obtained in the synthesis of the cyclic silanol, to perform recrystallization, performing filtration, and concentrating the solution of the soluble portion obtained by the filtration, in the same manner as for the silanol composition in this embodiment 1.

In the production of the silanol composition in this embodiment 2, the concentration of the solution of the soluble portion should be optionally performed, and the solution of the soluble portion itself may be used as the silanol composition. In addition, in the concentration of the solution of the soluble portion, it is not necessary to remove all the solvent contained in the solution, and therefore the silanol composition in this embodiment 2 may be a crude concentrate obtained by distilling off some of the solvent contained in the solution of the soluble portion. Further, the silanol composition in this embodiment 2 may be one obtained by concentrating the solution of the soluble portion and then rediluting the concentrate with a solvent. As described above, one preferred mode of this embodiment 2 is a silanol composition comprising a solvent.

The amount of the solvent in the silanol composition comprising the solvent is not particularly limited but is preferably 95% by mass or less, more preferably 90% by mass or less, and further preferably 85% by mass or less based on the total amount of the silanol composition. The lower limit value of the amount of the solvent is not particularly limited but is usually 1% by mass or more.

Examples of the solvent in the silanol composition comprising the solvent include the water and/or the alcohol used in the reaction, and the good solvent and the poor solvent used during the recrystallization. Specific examples of the solvent include, but are not limited to, water, tetrahydrofuran, diethyl ether, acetone, methanol, ethanol, isopropanol, dimethylformamide, dimethyl sulfoxide, glycerin, ethylene glycol, methyl ethyl ketone, toluene, chloroform, hexane, dichloromethane, and xylene. These solvents may each be one alone or may be a combination of two or more.

The cured product in this embodiment 2 is a cured product of a silanol composition comprising a cyclic silanol containing a silanol group and having a cyclic structure formed by a siloxane bond, and a dehydration condensation product thereof, having a peak top in the range of 470 cm$^{-1}$ or more and 600 cm$^{-1}$ in the Raman spectrum. Here, the peak top present in the range of 470 to 600 cm$^{-1}$ is due to the particular ring structure of the siloxane. The factor of excellent crack resistance due to having a peak top in the particular range in the Raman spectrum is considered as follows. That is, it is considered that by having a cyclic skeleton, the rigidity and the flexibility are balanced, and therefore the mechanical strength against stress that occurs during light irradiation increases.

The cured product in this embodiment 2 is excellent in crack resistance during light irradiation when the peak top in the Raman spectrum of the cured product is within the predetermined range.

The range in which the peak top in the Raman spectrum in this embodiment 2 is present is 470 cm$^{-1}$ or more and 600 cm$^{-1}$ and may be 470 cm$^{-1}$ or more and 575 cm$^{-1}$ or less, may be, for example, 470 cm$^{-1}$ or more and 550 cm$^{-1}$ or less, may be, for example, 480 cm$^{-1}$ or more and 550 cm$^{-1}$ or less, or may be, for example, 480 cm$^{-1}$ or more and 530 cm$^{-1}$ or less.

The Raman spectrum of the cured product can be measured according to a method described in Examples described later.

The haze of the cured product in this embodiment 2 is preferably 101 or less. When the haze of the silanol cured product is 10% or less, the transparency and the adhesiveness tend to be even better.

Examples of the method for setting the haze of the cured product at 10% or less include a method of adjusting the proportions of the isomers in the cyclic silanol (A1) represented by formula (1) to decrease the proportions of the isomers having high crystallinity, and a method of reducing the amounts of metals contained in the silanol composition.

The haze of the cured product is preferably 5% or less, more preferably 2% or less, and further preferably 1% or less.

The haze of the cured product can be specifically measured by a method described in Examples.

For the curing method, the curing catalyst, and the like for the cured product in this embodiment 2, the same curing method, curing catalyst, and the like as in this embodiment 1 described above can be used.

The cured product in this embodiment 2 can be used as an adhesive in the same manner as in this embodiment 1 described above.

[Modified Cured Product]

The modified cured product in this embodiment 2 is obtained by irradiating the cured product in this embodiment 2 with light. Thus, the monovalent groups (for example, R represented by formula (1) when the cyclic silanol is the cyclic silanol (A1) represented by formula (1)) contained in the cured product are converted into hydroxyl groups, and therefore the hydroxyl group density (silanol group density) in the cured product can be increased. The obtained modified cured product is excellent in reactivity. Here, when a cured product comprising a cyclic silanol is irradiated with light, cracking tends to occur, but as described above, even if the cured product in this embodiment is irradiated with light, cracks are less likely to be caused. Therefore, the modified cured product has the characteristics of suppressed occurrence of cracks and excellent reactivity.

In the modified cured product in this embodiment 2, the cyclic silanol and the dehydration condensation product thereof are preferably the cyclic silanol (A1) represented by the above formula (1) and the dehydration condensation product thereof (A2). In this case, the modified cured product preferably comprises a site in which the conversion rate of the groups represented by R in the above formula (1) into hydroxyl groups is 100% (completely converted site). In the modified cured product, the conversion rate into hydroxyl groups is preferably 100% on its entire surface (all). However, even if the cured product is irradiated with light using the usual light irradiation apparatus, the intensity of irradiation light is different depending on the sites, and therefore it is difficult to set the conversion rate into hydroxyl groups at 100% on the entire surface. Therefore, usually, in the modified cured product, a site in which the groups represented by R are converted into hydroxyl groups, and a site in which the groups represented by R are not converted into hydroxyl groups are present even if the modified cured product is irradiated with light over the front surface.

That is, the modified cured product in this embodiment 2 comprises a site in which the conversion rate of the groups represented by R in the above formula (1) into hydroxyl groups is 100%, and thus tends to be a better material from the viewpoint of stability to heat, light, and impact.

The modified cured product is obtained by irradiating the cured product with light. Examples of the light source when the cured product is irradiated with light include lasers, LEDs, and lamps. Light irradiation may be performed in the presence of ozone using a commercial apparatus such as SEN LIGHTS CORPORATION PL17-110.

The wavelength of light when the cured product is irradiated with light is preferably 10 nm or more and 400 nm or less, more preferably 200 nm or more and 300 nm or less. When the wavelength of light when the cured product is irradiated with light is within the above range, the occurrence of cracks due to the photolysis of the silicon-methyl groups can be suppressed, and therefore the crack resistance effect tends to be significant.

When the wave number in the Raman spectrum derived from the siloxane skeleton of the cured product is X, and the wave number in the Raman spectrum derived from the siloxane skeleton of the modified cured product is Y, |X−Y| is preferably 25 or less, more preferably 20 or less, further preferably 15 or less, still more preferably 10 or less, and particularly preferably 5 or less. When |X−Y| is equal to or less than the above value, the structure can be more maintained even if light irradiation is performed, and therefore the crack resistance tends to be even better.

Third Embodiment

The cured product in this embodiment 3 is
a cured product of a silanol composition comprising a cyclic silanol containing a silanol group and having a cyclic structure formed by a siloxane bond, and a dehydration condensation product thereof,
having a hardness of 0.01 GPa or more and 1 GPa or less.

Here, the cyclic silanol containing a silanol group and having a cyclic structure formed by a siloxane bond, and the dehydration condensation product thereof contained in the silanol composition are not particularly limited, and examples thereof include the cyclic silanol (A1) represented by formula (1) and the dehydration condensation product of the cyclic silanol (A2) described above. In this case, the cured product in this embodiment 3 is obtained by forming siloxane bonds (—Si—O—Si—) by the dehydration condensation reaction of silanol groups (—Si—OH) contained in the cyclic silanol and the dehydration condensation product thereof.

The silanol composition in this embodiment 3 is preferably produced by oxidizing a hydrosilane compound in the presence of water or an alcohol to prepare a cyclic silanol, adding a poor solvent to a good solvent solution of the product obtained in the synthesis of the cyclic silanol, to perform recrystallization, performing filtration, and concentrating the solution of the soluble portion obtained by the filtration, in the same manner as for the silanol composition in this embodiment 1.

In the production of the silanol composition in this embodiment 3, the concentration of the solution of the soluble portion should be optionally performed, and the solution of the soluble portion itself may be used as the silanol composition. In addition, in the concentration of the solution of the soluble portion, it is not necessary to remove all the solvent contained in the solution, and therefore the silanol composition in this embodiment 3 may be a crude concentrate obtained by distilling off some of the solvent contained in the solution of the soluble portion. Further, the silanol composition in this embodiment 3 may be one obtained by concentrating the solution of the soluble portion and then rediluting the concentrate with a solvent. As described above, one preferred mode of this embodiment 3 is a silanol composition comprising a solvent.

The amount of the solvent in the silanol composition comprising the solvent is not particularly limited but is preferably 95% by mass or less, more preferably 90% by mass or less, and further preferably 85% by mass or less based on the total amount of the silanol composition. The lower limit value of the amount of the solvent is not particularly limited but is usually 1% by mass or more.

Examples of the solvent in the silanol composition comprising the solvent include the water and/or the alcohol used in the reaction, and the good solvent and the poor solvent used during the recrystallization. Specific examples of the solvent include, but are not limited to, water, tetrahydrofuran, diethyl ether, acetone, methanol, ethanol, isopropanol, dimethylformamide, dimethyl sulfoxide, glycerin, ethylene glycol, methyl ethyl ketone, toluene, chloroform, hexane, dichloromethane, and xylene. These solvents may each be one alone or may be a combination of two or more.

The cured product in this embodiment 3 is a cured product of a silanol composition comprising a cyclic silanol containing a silanol group and having a cyclic structure formed by a siloxane bond, and a dehydration condensation product thereof, having a hardness of 0.01 GPa or more and 1 GPa or less.

The cured product in this embodiment 3 is excellent in crack resistance during light irradiation when the hardness of the cured product is within the predetermined range.

The hardness of the cured product in this embodiment 3 is 0.01 GPa or more and 1.0 GPa or less, preferably 0.03 GPa or more and 0.9 GPa or less, more preferably 0.05 GPa or more and 0.8 GPa or less, further preferably 0.1 GPa or more and 0.7 GPa or less, and particularly 0.1 GPa or more and 0.6 GPa or less (preferably 0.1 GPa or more and 0.5 GPa or less, more preferably 0.2 GPa or more and 0.5 GPa or less). When the hardness is 0.01 GPa or more, the form of the cured product is sufficiently maintained, and the occurrence of cracks due to gas generation from the material accompanying light irradiation can be reduced, and therefore the crack resistance during light irradiation is excellent. On the other hand, when the hardness is 1.0 GPa or less, the crack resistance after light irradiation tends to be excellent in terms of being able to reduce residual stress that occurs in the material after curing.

The Young's modulus of the cured product in this embodiment 3 is preferably 0.1 GPa or more and 30 GPa or less, more preferably 0.3 GPa or more and 26 GPa or less, further preferably 0.5 GPa or more and 25 GPa or less, and particularly 1 GPa or more and 20 GPa or less (preferably 1 GPa or more and 18 GPa or less, more preferably 1 GPa or more and 16 GPa or less, further preferably 1 GPa or more and 14 GPa or less, and particularly 1 GPa or more and 12 GPa or less). When the Young's modulus is 0.1 GPa or more, the form of the cured product is sufficiently maintained, and the occurrence of cracks due to gas generation from the material accompanying light irradiation can be reduced, and therefore the crack resistance during light irradiation tends to be excellent. On the other hand, when the Young's modulus is 30 GPa or less, the crack resistance after light irradiation tends to be excellent in terms of being able to reduce residual stress that occurs in the material after curing The hardness and Young's modulus of the cured product are each measured according to the following measurement condition:
Measurement site: a portion at a depth of 20 nm or more and 100 nm or less from the surface of the cured product The haze of the cured product in this embodiment 3 is preferably 10% or less. When the haze of the silanol cured product is 10% or less, the transparency and the adhesiveness tend to be even better.

Examples of the method for setting the haze of the cured product at 10% or less include a method of adjusting the proportions of the isomers in the cyclic silanol (A1) represented by formula (1) to decrease the proportions of the isomers having high crystallinity, and a method of reducing the amounts of metals contained in the silanol composition.

The haze of the cured product is preferably 5% or less, more preferably 2% or less, and further preferably 1% or less.

The haze of the cured product can be specifically measured by a method described in Examples.

For the curing method, the curing catalyst, and the like for the cured product in this embodiment 3, the same curing method, curing catalyst, and the like as in this embodiment 1 described above can be used.

The cured product in this embodiment 3 can be used as an adhesive in the same manner as in this embodiment 1 described above.

[Modified Cured Product]

The modified cured product in this embodiment 3 is obtained by irradiating the cured product in this embodiment 3 with light. Thus, the monovalent groups (for example, R represented by formula (1) when the cyclic silanol is the cyclic silanol (A1) represented by formula (1)) contained in the cured product are converted into hydroxyl groups, and therefore the hydroxyl group density (silanol group density) in the cured product can be increased. The obtained modified cured product is excellent in reactivity. Here, when a cured product comprising a cyclic silanol is irradiated with light, cracking tends to occur, but as described above, even if the cured product in this embodiment 3 is irradiated with light, cracks are less likely to be caused. Therefore, the modified cured product has the characteristics of suppressed occurrence of cracks and excellent reactivity.

In the modified cured product in this embodiment 3, the cyclic silanol and the dehydration condensation product thereof are preferably the cyclic silanol (A1) represented by the above formula (1) and the dehydration condensation product thereof (A2). In this case, the modified cured product preferably comprises a site in which the conversion rate of the groups represented by R in the above formula (1) into hydroxyl groups is 100% (completely converted site). In the modified cured product, the conversion rate into hydroxyl groups is preferably 100% on its entire surface (all). However, even if the cured product is irradiated with light using the usual light irradiation apparatus, the intensity of irradiation light is different depending on the sites, and therefore it is difficult to set the conversion rate into hydroxyl groups at 100% on the entire surface. Therefore, usually, in the modified cured product, a site in which the groups represented by R are converted into hydroxyl groups, and a site in which the groups represented by R are not converted into hydroxyl groups are present even if the modified cured product is irradiated with light over the front surface.

That is, the modified cured product in this embodiment 3 comprises a site in which the conversion rate of the groups represented by R in the above formula (1) into hydroxyl groups is 100%, and thus tends to be a better material from the viewpoint of stability to heat, light, and impact.

The modified cured product is obtained by irradiating the cured product with light. Examples of the light source when the cured product is irradiated with light include lasers, LEDs, and lamps. Light irradiation may be performed in the presence of ozone using a commercial apparatus such as SEN LIGHTS CORPORATION PL17-110.

The wavelength of light when the cured product is irradiated with light is preferably 10 nm or more and 400 nm or less, more preferably 200 nm or more and 300 nm or less. When the wavelength of light when the cured product is irradiated with light is within the above range, the occurrence of cracks due to the photolysis of the silicon-methyl groups can be suppressed, and therefore the crack resistance effect tends to be significant.

The hardness of the modified cured product in this embodiment 3 is preferably 0.2 GPa or more and 10 GPa or less, more preferably 0.2 GPa or more and 9 GPa or less, further preferably 0.2 GPa or more and 8 GPa or less, still more preferably 0.3 GPa or more and 7 GPa or less, and particularly preferably 0.5 GPa or more and 6 GPa or less. When the hardness is 0.2 GPa or more, the occurrence of cracks due to gas generation from the material accompanying light irradiation can be reduced, and therefore the crack resistance during light irradiation tends to be excellent. On the other hand, when the hardness is 10 GPa or less, the crack resistance after light irradiation tends to be excellent in terms of being able to reduce residual stress that occurs in the material after curing.

The Young's modulus of the modified cured product in this embodiment 3 is preferably 1 GPa or more and 100 GPa or less, more preferably 1 GPa or more and 90 GPa or less, further preferably 1 GPa or more and 80 GPa or less, still more preferably 1 GPa or more and 70 GPa or less, and particularly preferably 1 GPa or more and 60 GPa or less. When the hardness is 1 GPa or more, the occurrence of cracks due to gas generation from the material accompanying light irradiation can be reduced, and therefore the crack resistance during light irradiation tends to be excellent. On the other hand, when the hardness is 100 GPa or less, the crack resistance after light irradiation tends to be excellent in terms of being able to reduce residual stress that occurs in the material after curing.

The hardness and Young's modulus of the modified cured product are each obtained by the same method as the method for measuring the hardness and Young's modulus of the cured product.

The hardness change of the cured product due to light irradiation (the hardness (GPa) of the modified cured product after light irradiation/the hardness (GPa) of the cured product before light irradiation) is preferably 1 time or more and 100 times or less, more preferably 1 time or more and 20 times or less, and further preferably 1 time or more and 10 times or less. When the hardness change of the cured product due to light irradiation is 1 time or more, the occurrence of cracks accompanying internal occurrence in the material accompanying light irradiation tends to be able to be suppressed. When the hardness change is 100 times or less, the occurrence of cracks due to gas generation from the material accompanying light irradiation tends to be able to be reduced. However, when curing is performed at high temperature for a long time, the crack resistance after light irradiation may worsen due to the influence of residual stress after the curing even if the hardness change is small.

The Young's modulus change of the cured product due to light irradiation (the Young's modulus (GPa) of the modified cured product after light irradiation/the Young's modulus (GPa) of the cured product before light irradiation) is preferably 1 time or more and 100 times or less, more preferably 1 time or more and 50 times or less, and further preferably 1 time or more and 10 times or less. When the hardness change of the cured product due to light irradiation is 1 time or more, the occurrence of cracks due to decomposed gas generation from the material accompanying light irradiation tends to be able to be reduced. When the hardness change is 100 times or less, the occurrence of cracks due to internal occurrence in the material accompanying light irradiation tends to be able to be suppressed.

Fourth Embodiment

The cured product in this embodiment 4 is
a cured product of a silanol composition comprising a cyclic silanol containing a silanol group and having a cyclic structure formed by a siloxane bond, and a dehydration condensation product thereof,
having a film thickness of 0.01 µm or more and 2 µm or less.

Here, the cyclic silanol containing a silanol group and having a cyclic structure formed by a siloxane bond, and the dehydration condensation product thereof contained in the silanol composition are not particularly limited, and examples thereof include the cyclic silanol (A1) represented by formula (1) and the dehydration condensation product of the cyclic silanol (A2) described above. In this case, the cured product in this embodiment 4 is obtained by forming siloxane bonds (—Si—O—Si—) by the dehydration condensation reaction of silanol groups (—Si—OH) contained in the cyclic silanol and the dehydration condensation product thereof.

The silanol composition in this embodiment 4 is preferably produced by oxidizing a hydrosilane compound in the presence of water or an alcohol to prepare a cyclic silanol, adding a poor solvent to a good solvent solution of the product obtained in the synthesis of the cyclic silanol, to perform recrystallization, performing filtration, and concentrating the solution of the soluble portion obtained by the filtration, in the same manner as for the silanol composition in this embodiment 1.

In the production of the silanol composition in this embodiment 4, the concentration of the solution of the soluble portion should be optionally performed, and the solution of the soluble portion itself may be used as the silanol composition. In addition, in the concentration of the solution of the soluble portion, it is not necessary to remove all the solvent contained in the solution, and therefore the silanol composition in this embodiment 4 may be a crude concentrate obtained by distilling off some of the solvent contained in the solution of the soluble portion. Further, the silanol composition in this embodiment 4 may be one obtained by concentrating the solution of the soluble portion and then rediluting the concentrate with a solvent. As described above, one preferred mode of this embodiment 4 is a silanol composition comprising a solvent.

The amount of the solvent in the silanol composition comprising the solvent is not particularly limited but is preferably 95% by mass or less, more preferably 90% by mass or less, and further preferably 85% by mass or less based on the total amount of the silanol composition. The lower limit value of the amount of the solvent is not particularly limited but is usually 1% by mass or more.

Examples of the solvent in the silanol composition comprising the solvent include the water and/or the alcohol used in the reaction, and the good solvent and the poor solvent used during the recrystallization. Specific examples of the solvent include, but are not limited to, water, tetrahydrofuran, diethyl ether, acetone, methanol, ethanol, isopropanol, dimethylformamide, dimethyl sulfoxide, glycerin, ethylene glycol, methyl ethyl ketone, toluene, chloroform, hexane, dichloromethane, and xylene. These solvents may each be one alone or may be a combination of two or more.

The cured product in this embodiment 4 is a cured product of a silanol composition comprising a cyclic silanol containing a silanol group and having a cyclic structure formed by a siloxane bond, and a dehydration condensation product thereof, having a film thickness of 0.01 µm or more and 2 µm or less.

The cured product in this embodiment 4 is excellent in crack resistance during light irradiation when the film thickness of the cured product is within the predetermined range. When the cured product has a structure in which it is sandwiched between two materials, the crack resistance effect is more significant.

The film thickness in this embodiment 4 is 0.01 µm or more and 2 µm or less, preferably 0.03 µm or more and 2 µm or less, more preferably 0.05 µm or more and 2 µm or less, further preferably 0.1 µm or more and 2 µm or less, and particularly preferably 0.2 µm or more and 2 µm or less. When the film thickness is 0.01 µm or more, an adhesive layer having excellent adhesiveness can be formed. When the film thickness is 2 µm or less, cracks accompanying stress that occurs due to light irradiation can be reduced, and therefore the crack resistance is excellent.

The method for controlling the film thickness within the above range is not particularly limited, and examples thereof include methods of appropriately adjusting the solid concentration of the silanol composition, the type of the solvent contained in the silanol composition, the viscosity of the silanol composition, the application area, the application temperature, the drying temperature, the drying pressure, the humidity, and the like by known methods.

The film thickness of the cured product can be measured according to a method described in Examples described later.

The haze of the cured product in this embodiment 4 is preferably 10% or less. When the haze of the silanol cured product is 10% or less, the transparency and the adhesiveness tend to be even better.

Examples of the method for setting the haze of the cured product at 10% or less include a method of adjusting the proportions of the isomers in the cyclic silanol (A1) represented by formula (1) to decrease the proportions of the isomers having high crystallinity, and a method of reducing the amounts of metals contained in the silanol composition.

The haze of the cured product is preferably 5% or less, more preferably 2% or less, and further preferably 1% or less.

The haze of the cured product can be specifically measured by a method described in Examples.

For the curing method, the curing catalyst, and the like for the cured product in this embodiment 4, the same curing method, curing catalyst, and the like as in this embodiment 1 described above can be used.

The cured product in this embodiment 4 can be used as an adhesive in the same manner as in this embodiment 1 described above.

[Modified Cured Product]

The modified cured product in this embodiment 4 is obtained by irradiating the cured product in this embodiment 4 with light. Thus, the monovalent groups (for example, R represented by formula (1) when the cyclic silanol is the cyclic silanol (A1) represented by formula (1)) contained in the cured product are converted into hydroxyl groups, and therefore the hydroxyl group density (silanol group density) in the cured product can be increased. The obtained modified cured product is excellent in reactivity. Here, when a cured product comprising a cyclic silanol is irradiated with light, cracking tends to occur, but as described above, even if the cured product in this embodiment 4 is irradiated with light, cracks are less likely to be caused. Therefore, the modified cured product has the characteristics of suppressed occurrence of cracks and excellent reactivity.

In the modified cured product in this embodiment 4, the cyclic silanol and the dehydration condensation product thereof are preferably the cyclic silanol (A1) represented by the above formula (1) and the dehydration condensation product thereof (A2). In this case, the modified cured product preferably comprises a site in which the conversion rate of the groups represented by R in the above formula (1) into hydroxyl groups is 100% (completely converted site). In the modified cured product, the conversion rate into hydroxyl groups is preferably 100% on its entire surface (all). However, even if the cured product is irradiated with light using the usual light irradiation apparatus, the intensity of irradiation light is different depending on the sites, and therefore it is difficult to set the conversion rate into hydroxyl groups at 100% on the entire surface. Therefore, usually, in the modified cured product, a site in which the groups represented by R are converted into hydroxyl groups, and a site in which the groups represented by R are not converted into hydroxyl groups are present even if the modified cured product is irradiated with light over the front surface.

That is, the modified cured product in this embodiment 4 comprises a site in which the conversion rate of the groups represented by R in the above formula (1) into hydroxyl groups is 100%, and thus tends to be a better material from the viewpoint of stability to heat, light, and impact.

The modified cured product is obtained by irradiating the cured product with light. Examples of the light source when the cured product is irradiated with light include lasers, LEDs, and lamps. Light irradiation may be performed in the presence of ozone using a commercial apparatus such as SEN LIGHTS CORPORATION PL17-110.

The wavelength of light when the cured product is irradiated with light is preferably 10 nm or more and 400 nm or less, more preferably 200 nm or more and 300 nm or less. When the wavelength of light when the cured product is irradiated with light is within the above range, the occurrence of cracks due to the photolysis of the silicon-methyl groups can be suppressed, and therefore the crack resistance effect tends to be significant.

Fifth Embodiment

The cured product in the fifth embodiment of the present invention (hereinafter also referred to as "this embodiment 5") is a cured product comprising a dehydration condensation product of a silanol formed by a siloxane bond, wherein the peak wave number of Si—OH stretching vibration is 940 $cm^{-1}$ or more and 960 $cm^{-1}$ or less in the IR spectrum, and the amount of functional groups defined by "0.1*a+b" (a and b are respectively the peak height of the Si—OH stretching vibration observed at 920±50 $cm^{-1}$ and the peak height of Si-methyl stretching vibration observed at 1270±10 $cm^{-1}$ when the peak height of Si—O—Si stretching vibration at 1030±40 $cm^{-1}$ is defined as 1) is 0 or more and 0.05 or less.

Here, "0.1*a+b" means the sum of the numerical value of ⅒ of the value of a, and the value of b Here, the dehydration condensation product of the silanol formed by a siloxane bond is not particularly limited, and examples thereof include the dehydration condensation product of the cyclic silanol represented by formula (1) described above. In this case, the cured product in this embodiment 5 is obtained by forming siloxane bonds (—Si—O—Si—) by the dehydration condensation reaction of silanol groups (—Si—OH) contained in the cyclic silanol and the dehydration condensation product thereof.

In the cured product in this embodiment 5, the peak wave number of the Si—OH stretching vibration is 940 cm$^{-1}$ or more and 960 cm$^{-1}$ or less in the IR spectrum, and the amount of functional groups defined by "0.1*a+b" (a and b are respectively the peak height of the Si—OH stretching vibration observed at 920±50 cm$^{-1}$ and the peak height of the Si-methyl stretching vibration observed at 1270±10 cm$^{-1}$ when the peak height of the Si—O—Si stretching vibration at 1030±40 cm$^{-1}$ is defined as 1) is 0 or more and 0.05 or less. The cured product in this embodiment 5 has the above features and thus achieves the effect of excellent crack resistance during light irradiation.

The peak wave number of the Si—OH stretching vibration is observed at 940 cm$^{-1}$ or more and 960 cm$^{-1}$ or less, and preferably observed at 940 cm$^{-1}$ or more and 950 cm$^{-1}$ or less because the crack resistance during light irradiation tends to improve further.

The amount of functional groups defined by 0.1*a+b is 0 or more and 0.05 or less, preferably 0 or more and 0.04 or less. When the amount of functional groups defined by 0.1*a+b is more than 0.05, the crack resistance during light irradiation decreases.

The cured product in this embodiment 5 preferably has a peak at 470 cm$^{-1}$ or more and 510 cm$^{-1}$ or less, more preferably 480 cm$^{-1}$ or more and 500 cm$^{-1}$, in the Raman spectrum. When the cured product in this embodiment 5 has a peak at 470 cm$^{-1}$ or more and 510 cm$^{-1}$ or less in the Raman spectrum, the structural change accompanying light irradiation tends to be small, and the crack resistance tends to be excellent.

The cured product in this embodiment 5 preferably has a hardness of 1.5 GPa or more, more preferably 2.0 GPa or more. When the hardness of the cured product is less than 1.5 GPa, the crack resistance during light irradiation tends to decrease.

The haze of the cured product in this embodiment 5 is preferably 101 or less. When the haze of the silanol cured product is 10% or less, the transparency and the adhesiveness tend to be even better. The haze of the cured product is preferably 5% or less, more preferably 2% or less, and further preferably 1% or less.

The peak wave number of the Si—OH stretching vibration, the amount of functional groups defined by "0.1*a+b", the peak in the Raman spectrum, the hardness, and the haze for the cured product can be specifically measured by methods described in Examples.

For the curing method, the curing catalyst, and the like for the cured product in this embodiment 5, the same curing method, curing catalyst, and the like as in this embodiment 1 described above can be used.

The cured product in this embodiment 5 can be used as an adhesive in the same manner as in this embodiment 1 described above.

A modified cured product after light irradiation is also included in the cured product in this embodiment 5. Here, for the method, the light source, and the like for the light irradiation, the same method, light source, and the like as in this embodiment 1 described above can be used. Here, when the dehydration condensation product of the silanol formed by a siloxane bond, contained in the cured product is the dehydration condensation product of the cyclic silanol represented by formula (1) described above, the cured product preferably comprises a site in which the conversion rate of the groups represented by R into hydroxyl groups is 100% (completely converted site). When the cured product in this embodiment 2 comprises a site in which the conversion rate of the groups represented by R in the above formula (1) into hydroxyl groups is 100%, the cured product tends to be a better material from the viewpoint of stability to heat, light, and impact.

EXAMPLES

The present invention will be more specifically described using Examples and Comparative Examples, but the present invention is not limited in any way by these Examples and the like.

The methods for measuring and evaluating the physical properties of the silanol compositions and cured products thereof and the modified cured products obtained by the present invention and the following Examples and Comparative Examples are as follows.

(Calculation of Weight Percent Concentration)

The weight percent concentration of a cyclic silanol and a polymer (dehydration condensation product) thereof in a solution was obtained by performing NMR measurement as follows, using ECZ400S manufactured by JEOL Ltd. and using a TFH probe for a probe.

For example, in the case of an isopropanol solution of tetrahydroxytetramethyltetracyclosiloxane and the polymer thereof, $^1$H-NMR was measured using a sample obtained by adding 1 g of deuterated acetone to 0.1 g of the isopropanol solution of tetrahydroxytetramethyltetracyclosiloxane and the polymer thereof. The base peak of the deuterated solvent was 2.05 ppm, and the measurement was performed with the number of accumulations being 64.

The weight percent concentration of tetrahydroxytetramethyltetracyclosiloxane and the polymer thereof can be approximately calculated by the following formula:

the weight percent concentration of tetrahydroxytetramethyltetracyclosiloxane and the polymer thereof=(the peak integral ratio of the methyl groups bonded to Si in the region of −0.1-0.3 ppm/12×304.51)/{(the peak integral ratio of the methyl groups bonded to Si in the region of −0.1-0.3 ppm/12×304.51)+(the peak integral value of the hydrogen bonded to the carbon of isopropanol in the region of 3.7-4.1 ppm/1×60.1)} wherein 304.51 shows the molecular weight of tetrahydroxytetramethyltetracyclosiloxane, and 60.1 shows the molecular weight of isopropanol.

(Measurement of Haze)

Haze was measured based on JISK7136 using a turbidimeter NDH5000W (manufactured by Nippon Denshoku Industries Co., Ltd.). A specific operation is shown below.

For the haze of a silanol composition, a 42 wt % isopropanol solution of the silanol composition was applied to a blank glass substrate 5 cm×5 cm×0.7 mm thick (manufactured by Techno Print Co., Ltd.) using a bar coater No. 40 (manufactured by AS ONE Corporation) and then dried under reduced pressure at 60° C. for 1 h, and the haze was measured. For the blank in the haze measurement, only a blank glass substrate 5 cm×5 cm×0.7 mm thick (manufactured by Techno Print Co., Ltd.) was used.

The haze of a cured product was measured using a sample obtained by heating a sample made in the measurement of the haze of a silanol composition, at atmospheric pressure for a predetermined time.

(IR Spectrum Measurement)

The ATR-IR of a specimen was measured using (models Spectrum 400 and Spotlight 400) manufactured by PerkinElmer Japan Co., Ltd. For the obtained IR spectrum, the area of the peak derived from Si—O—Si stretching observed at 960 to 1220 cm$^{-1}$, the area of the peak derived from SiO—H stretching observed at 2600 to 3800 cm$^{-1}$, and the peak area derived from Si-methyl stretching observed at 1220 to 1320 cm$^{-1}$ were obtained using calculation software IgorPro. However, the peak derived from the CH bonds at 2900 cm$^{-1}$ was not included in the area of the peak derived from the SiO—H stretching.

In addition, the ATR-IR of a specimen was measured using (models Spectrum 400 and Spotlight 400) manufactured by PerkinElmer Japan Co., Ltd. For the obtained IR spectrum, a=the peak height of Si—OH stretching vibration observed at 920±50 cm$^{-1}$ and b=the peak height of Si-methyl stretching vibration observed at 1270±10 cm$^{-1}$ when the peak height of Si—O—Si stretching vibration at 1030±40 cm$^{-1}$ was defined as 1 were obtained using analysis software Spectrum manufactured by PerkinElmer Japan Co., Ltd. From these values, the amount of functional groups defined by "0.1*a+b" was calculated.

(Laser Raman Measurement)

Except that an aluminum nitride substrate was used instead of the glass substrate in order to eliminate the influence of the base in Raman spectrum measurement, a cured product was made by the same operation as in the haze measurement sample making to obtain a Raman spectrum measurement sample.

The Raman spectrum at 532 nm was measured using a laser Raman microscope (model: RAMANtouch) from Nanophoton Corporation.

(Measurement of Hardness and Young's Modulus)

Hardness and a Young's modulus were measured using TriboIndenter manufactured by Hysitron. In order to avoid the influence of a base as much as possible, the values of hardness (GPa) and a Young's modulus (GPa) at a depth of 30 nm or more and 60 nm or less from a surface were read.

Measurement site: a portion at a depth of 30 nm or more and 60 nm or less from a surface
Maximum load holding time: 2 s
Unloading time: 5.625 s (Measurement of Film Thickness)

For film thickness, a sample made for the measurement of haze was measured by a surface shape measuring machine meter (manufactured by factory name: Kosaka Laboratory Ltd. model: ET4000AK31), and the film thickness was calculated.

(Confirmation of Adhesive Force)

A hemispherical quartz lens having a diameter of 2 mm was placed on a sample made in the measurement of the haze of a silanol composition, with a load of 400 g for 3 s using T-3000-FC3 Manual Die Bonder (manufactured by TRESKY). Then, heating was performed under atmospheric pressure at 100° C. for 2 h, and then the obtained glass on which the hemispherical lens was placed was pushed sideways, and the presence or absence of adhesion was confirmed.

(Measurement of Area Ratio between Cyclic Silanol (A1) and Dehydration Condensation Product (A2) by GPC)

A solution obtained by dissolving a silanol composition in tetrahydrofuran in a proportion of 1.5 mL per 0.03 g of the silanol composition was used as a measurement specimen.

Measurement was performed by HLC-8220GPC manufactured by Tosoh Corporation, using this measurement specimen.

Analysis was performed at a rate of 0.35 ml/min using TSK guardcolumn SuperH-H, TSKgel SuperHM-H, TSKgel SuperHM-H, TSKgel SuperH2000, and TSKgel SuperH1000 manufactured by Tosoh Corporation, coupled in series, for columns, and tetrahydrofuran as a mobile phase.

Number average molecular weight and weight average molecular weight were obtained using an RI detector for a detector, and polymethyl methacrylate standard specimens (molecular weight: 2100000, 322000, 87800, 20850, 2000, 670000, 130000, 46300, 11800, 860) manufactured by American Polymer Standards Corporation, and 1,3,5,7-tetramethylcyclotetrasiloxane (molecular weight 240.5, manufactured by TOKYO CHEMICAL INDUSTRY CO., LTD), as standard substances. Peaks at p=0 and p≥1 were identified, and the area ratio between the respective peaks of a cyclic silanol (A1) and a dehydration condensation product (A2) was calculated.

(Content of Transition Metal (Pd))

Fluoronitric acid was added to a silanol composition, and the mixture was subjected to sealed and pressurized acid decomposition. Then, the specimen was transferred to a Teflon (registered trademark) beaker and heated to dryness. Then, aqua regia was added to the specimen, the volume of the solution in which the specimen was completely dissolved was adjusted to 20 mL, and the quantitative analysis of the proportions of the metals in the specimen using an ICP mass spectrometer (iCAP Qc manufactured by Themo Fisher Scientifi) was performed.

(Calculation of Proportions of Stereoisomers of Cyclic Silanol Using $^1$H-NMR Measurement)

NMR measurement was performed as follows, using ECZ400S manufactured by JEOL Ltd. and using a TFH probe for a probe.

0.1 g of a product and 1 g of deuterated acetone were added to an obtained silanol composition, and 1H-NMR was measured. The base peak of the deuterated solvent was 2.05 ppm, and the measurement was performed with the number of accumulations being 64.

When oxidation was performed using, for a starting material, tetramethyltetracyclosiloxane as a hydrosilane compound, six types of peaks of the methyl groups bonded to Si, derived from four types of isomers were observed in the region of 0.04-0.95 ppm in the $^1$H-NMR of the obtained tetrahydroxytetramethyltetracyclosiloxane.

The hydrogen of the methyl groups was observed in the order of the all-cis type (0.057 ppm), the trans-trans-cis type (0.064 ppm), the trans-trans-cis type (0.067 ppm), the cis-trans-cis type (0.074 ppm), the all-trans type (0.080 ppm), and the trans-trans-cis type (0.087 ppm) from the high magnetic field side. Waveform separation by Lorentz transformation was performed for the six peaks using Delta 5.2.1 (manufactured by JEOL Ltd.), and from these peak intensities of hydrogen, the respective proportions of the stereoisomers of the cyclic silanol were calculated.

(Preparation of Stereoisomers)

all-cis Form (Cyclic Silanol (B1))
 The all-cis form was synthesized according to a synthesis example in Inorganic Chemistry Vol. 49, No. 2, 2010.

cis-trans-cis Form (Cyclic Silanol (B2))
 The recrystallized product obtained in Example 1 was used.

all-trans Form (Cyclic Silanol (B4))
 A tetrahydrofuran-dichloromethane mixed solution of 10 wt. of the silanol made in Example 1 was further concentrated, and concentrated to 20 wt % of the silanol. The fractionation of the stereoisomers was performed using the concentrated solution and using liquid chromatography.

<Conditions of Liquid Chromatography>
Apparatus liquid chromatography manufactured by GL SCIENCES INC.
Pump: PU715
Column oven: CO705
Fraction collector: FC204YMC-PackSIL-06 ϕ30 mm×250 mm
Eluent: Cyclohexane/EtoAc=60/40
Flow rate: 40 mL/min
Amount injected: 5 mL
Temperature: 40° C.
Detection: The obtained fractions were evaluated and detected by ELSD measurement.

The obtained eluent of the all-trans form was allowed to stand. Crystals of the all-trans form were obtained and therefore collected by filtration.

trans-trans-cis Form (Cyclic Silanol (B3))

An eluent obtained by the same method as for the all-trans form was concentrated and then replaced by isopropanol to obtain the trans-trans-cis form.

Examples of this Embodiment 1

Example 1-1

(Preparation of Silanol Composition)

28 g of distilled water, 960 mL of tetrahydrofuran (manufactured by Wako Pure Chemical Industries, Ltd.), and 3.7 g of Pd/C (10% palladium-carbon, manufactured by N.E. CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of Pd/C (10% palladium/carbon) was added three times, and the reaction was performed for a total of 17 h. For the disappearance of the SiH groups, with the reaction liquid, $^1$H-NMR was measured with a deuterated acetone solution of the reaction liquid at a concentration of 1 wt % using an NMR (ECZ400S) manufactured by JEOL Ltd., and the disappearance of the SiH groups present at 4 to 5 ppm was confirmed.

75 g of magnesium sulfate was added to the reaction liquid, and the mixture was stirred at 5° C. for 30 min. A funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution. This solution was concentrated in a water bath at 15° C. using an evaporator to a remaining amount of 587 g (649 mL) and introduced into a mixed solvent of 217 mL of tetrahydrofuran and 4.4 L of dichloromethane. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure, and concentrated until it became a tetrahydrofuran-dichloromethane mixed solution of 10 wt % of a silanol composition. 10 g of the tetrahydrofuran-dichloromethane mixed solution of 10 wt % of the silanol composition was concentrated to 1 g under reduced pressure, and then 100 g of isopropanol was added again. Further, the mixture was concentrated under reduced pressure again to make the silanol composition (isopropanol solution) at a predetermined concentration.

The physical properties such as haze were evaluated using the obtained silanol composition. In addition, the proportions of the stereoisomers of the cyclic silanol were calculated by $^1$H-NMR. The $^1$H-NMR spectrum is shown in FIG. 1.

(Preparation of Cured Product)

The silanol composition obtained above was thermally cured at 100° C. for 2 h to obtain a cured product.

(Preparation of Modified Cured Product)

Further, the cured product was irradiated with light in a state of adhering closely to the light source of a UVC ozone treatment apparatus manufactured by SEN LIGHTS CORPORATION, to obtain a modified cured product. Of 10 modified cured products made, the number of those in which no cracks occurred was counted. In addition, the IR of the cured product and the modified cured product was measured, and the SiO—H stretching/Si—O—Si stretching area ratio and the Si-methyl stretching/Si—O—Si stretching area ratio were obtained. As a result of analysis by ATR-IR, the obtained modified cured product comprised a site in which the conversion rate from methyl groups into hydroxyl groups due to light irradiation was 100%. The site was a place at a position directly under the light source where the irradiation intensity was considered to be highest.

Example 1-2

The same experiments as in Example 1-1 were performed except that the all-trans form (cyclic silanol (B4)) prepared in the above (Preparation of Stereoisomers) was added to the silanol composition (isopropanol solution) made in Example 1-1, and the all-trans form ratio was 43%.

Example 1-3

The same experiments as in Example 1-1 were performed except that the all-trans form (cyclic silanol (B4)) prepared in the above (Preparation of Stereoisomers) was added to the silanol composition (isopropanol solution) made in Example 1-1, and the all-trans form ratio was 56%.

Example 1-4

The same experiments as in Example 1-1 were performed except that the all-cis form (cyclic silanol (B1)) prepared in the above (Preparation of Stereoisomers) was added to the silanol composition (isopropanol solution) made in Example 1-1, and the all-cis form form ratio was 31%.

Example 1-5

The same experiments as in Example 1-1 were performed except that the all-cis form (cyclic silanol (B1)) prepared in the above (Preparation of Stereoisomers) was added to the silanol composition (isopropanol solution) made in Example 1-1, and the all-cis form ratio was 41%.

Example 1-6

The same experiments as in Example 1-1 were performed except that the trans-trans-cis form (cyclic silanol (B3)) prepared in the above (Preparation of Stereoisomers) was added to the silanol composition (isopropanol solution) made in Example 1-1, and the trans-trans-cis form ratio was 661.

Example 1-7

Figure 2:
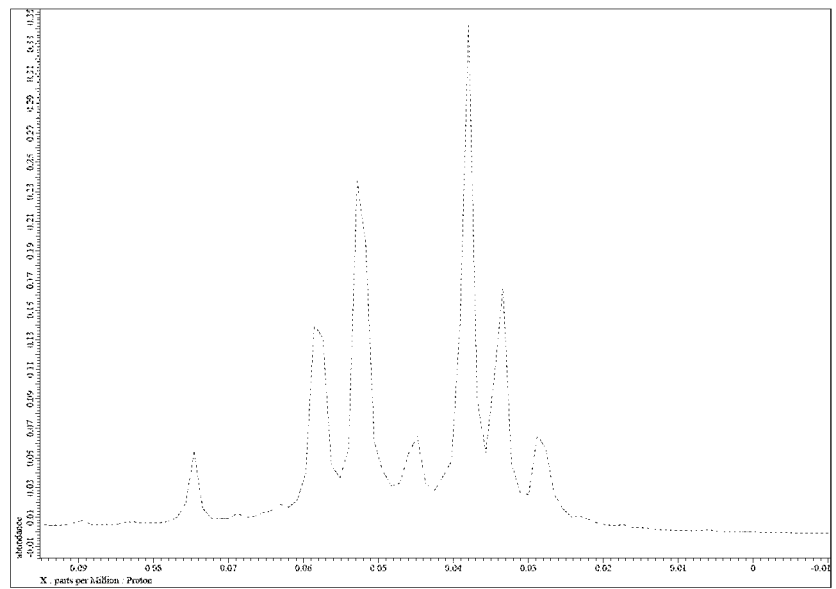
FIG. 2 is a diagram showing the $^1$H-NMR spectrum used when calculating the proportions of the stereoisomers of the silanol composition obtained in Example 1-7.

The same experiments as in Example 1-1 were performed except that the recrystallization temperature in Example 1-1 was −40° C. The $^1$H-NMR spectrum is shown in FIG. 2.

Example 1-8

The same experiments as in Example 1-1 were performed except that the temperature of thermal curing in Example 1-1 was 120° C.

Example 1-9

The same experiments as in Example 1-1 were performed except that the temperature of thermal curing in Example 1-1 was 150° C.

Example 1-10

The same experiments as in Example 1-1 were performed except that the temperature of thermal curing in Example 1-1 was 180° C.

Example 1-11

The same experiments as in Example 1-1 were performed except that the temperature of thermal curing in Example 1-1 was 210° C., and the curing time was 24 h.

Comparative Example 1-1

The same experiments as in Example 1-1 were performed using a cured product obtained by heating at 150° C. for 2 h using JCR6122 (manufactured by Dow Corning).

Comparative Example 1-2

The same experiments as in Example 1-1 were performed using a methylsiloxane cured product obtained by heating at 180° C. for 2 h a solution obtained by mixing methyltrimethoxysilane (TOKYO CHEMICAL INDUSTRY CO., LTD.), acetic acid, water, and ethanol and then stirring the mixture at room temperature for 24 h.

Comparative Example 1-3

The same experiments as in Example 1-1 were performed using a dimethyl silicone-methylsiloxane cured product obtained by heating at 180° C. for 2 h a solution obtained by mixing methyltrimethoxysilane (TOKYO CHEMICAL INDUSTRY CO., LTD.), dimethyldimethoxysilane (TOKYO CHEMICAL INDUSTRY CO., LTD.), acetic acid water, and ethanol and then stirring the mixture at room temperature for 24 h.

Comparative Example 1-4

The same experiments as in Example 1-1 were performed using a tetraethoxysilane cured product obtained by heating at 180° C. for 2 h a solution obtained by mixing tetraethoxysilane (TOKYO CHEMICAL INDUSTRY CO., LTD.), acetic acid water, and ethanol and then stirring the mixture at room temperature for 1 h.

The physical properties and evaluation results of the silanol compositions and the cured products obtained in the Examples and the Comparative Examples are shown in Table 1 and Table 2.

TABLE 1

|  | Example 1-1 | Example 1-2 | Example 1-3 | Example 1-4 | Example 1-5 | Example 1-6 |
|---|---|---|---|---|---|---|
| Starting material; cyclic siloxane | D4H | D4H | D4H | D4H | D4H | D4H |
| Proportion of all-cis cyclic silanol (%) | 6 | 4 | 3 | 31 | 41 | 5 |
| Proportion of cis-trans-cis cyclic silanol (%) | 12 | 10 | 12 | 9 | 8 | 13 |
| Proportion of all-trans cyclic silanol (%) | 25 | 43 | 56 | 17 | 14 | 16 |
| Proportion of trans-trans-cis cyclic silanol (%) | 57 | 43 | 29 | 43 | 37 | 66 |
| (A2)/[(A1) + (A2)] area ratio (%) | 20 | 20 | 20 | 20 | 20 | 20 |
| Residual transition metal (Pd) content (ppm) | <1 | <1 | <1 | <1 | <1 | <1 |
| Recrystallization temperature (° C.) | 5 | 5 | 5 | 5 | 5 | 5 |
| Adhesive force | Adhered | Adhered | Adhered | Adhered | Adhered | Adhered |
| Film thickness (μm) | 2 | 2 | 2 | 2 | 2 | 2 |
| Haze of silanol composition (%) | 0.2 | 0.4 | 1 | 0.2 | 0.2 | 1 |
| Haze of cured product of silanol composition (%) | 0.2 | 1 | 1 | 0.2 | 0.2 | 1 |
| Curing temperature (° C.) | 100 | 100 | 100 | 100 | 100 | 100 |
| Curing time (h) | 2 | 2 | 2 | 2 | 2 | 2 |
| Si-methyl stretching/Si—O—Si stretching area ratio of cured product | 0.05 | 0.05 | 0.05 | 0.05 | 0.05 | 0.05 |
| Si-methyl group/Si—O—Si stretching area ratio of modifiedcured product | 0 | — | — | — | — | — |
| SiO-H stretching/Si—O—Si stretching area ratio of cured product | 0.14 | 0.15 | 0.15 | 0.14 | 0.14 | 0.15 |
| SiO—H stretching/Si—O—Si stretching area ratio of modified cured product | 0.277 | — | — | — | — | — |
| Crack resistance during light irradiation | 9/10 | 7/10 | 7/10 | 5/10 | 5/10 | 7/10 |

|  | Example 1-7 | Example 1-8 | Example 1-9 | Example 1-10 | Example 1-11 |
|---|---|---|---|---|---|
| Starting material; cyclic siloxane | D4H | D4H | D4H | D4H | D4H |
| Proportion of all-cis cyclic silanol (%) | 7 | 6 | 6 | 6 | 6 |
| Proportion of cis-trans-cis cyclic silanol (%) | 4 | 12 | 12 | 12 | 12 |
| Proportion of all-trans cyclic silanol (%) | 27 | 25 | 25 | 25 | 25 |
| Proportion of trans-trans-cis cyclic silanol (%) | 62 | 57 | 57 | 57 | 57 |
| (A2)/[(A1) + (A2)] area ratio (%) | 20 | 20 | 20 | 20 | 20 |
| Residual transition metal (Pd) content (ppm) | <1 | <1 | <1 | <1 | <1 |

TABLE 1-continued

|   | | | | |
|---|---|---|---|---|---|
| Recrystallization temperature (° C.) | −40 | 5 | 5 | 5 | 5 |
| Adhesive force | Adhered | Adhered | Adhered | Adhered | Adhered |
| Film thickness (μm) | 2 | 2 | 2 | 2 | 2 |
| Haze of silanol composition (%) | 0.1 | 0.2 | 0.2 | 0.2 | 0.2 |
| Haze of cured product of silanol composition (%) | 0.1 | 0.2 | 0.2 | 0.2 | 0.2 |
| Curing temperature (° C.) | 100 | 120 | 150 | 180 | 210 |
| Curing time (h) | 2 | 2 | 2 | 2 | 2 |
| Si-methyl stretching/Si—O—Si stretching area ratio of cured product | 0.05 | 0.05 | 0.05 | 0.05 | 0.05 |
| Si-methyl group/Si—O—Si stretching area ratio of modified cured product | — | — | — | — | — |
| SiO—H stretching/Si—O—Si stretching area ratio of cured product | 0.14 | 0.08 | 0.07 | 0.06 | 0.03 |
| SiO—H stretching/Si—O—Si stretching area ratio of modified cured product | — | — | — | — | — |
| Crack resistance during light irradiation | 10/10 | 9/10 | 10/10 | 9/10 | 3/10 |

TABLE 2

|   | Comparative Example 1-1 | Comparative Example 1-2 | Comparative Example 1-3 | Comparative Example 1-4 |
|---|---|---|---|---|
| Cured product | Dimethyl silicone cured product | Methylsiloxane random cured product | Dimethyl silicone + methylsiloxane random cured product | Tetraethoxysilane polymer |
| Adhesive force | Adhered | Adhered | Adhered | Adhered |
| Film thickness (μm) | 2 | 2 | 2 | 0.2 |
| Haze of silanol composition (%) | 0.2 | 0.2 | 0.2 | 0.2 |
| Haze of cured product of silanol composition (%) | 0.2 | 0.2 | 0.2 | 1 |
| Curing temperature (° C.) | 150 | 180 | 180 | 180 |
| Curing time(h) | 2 | 2 | 2 | 2 |
| Si-methyl stretching/Si—O—Si stretching area ratio of cured product | 0.1 | 0.05 | 0.057 | 0 |
| Si-methyl stretching/Si—O—Si stretching area ratio of modified cured product | 0.0019 | 0 | 0.00094 | — |
| SiO—H stretching/Si—O—Si stretching area ratio of cured product | 0 | 0.03 | 0.001 | 0.08 |
| SiO—H stretching/Si—O—Si stretching area ratio of modified cured product | 0.12 | 0.12 | 0.17 | — |
| Crack resistance during light irradiation | 0/10 | 0/10 | 0/10 | 0/10 |

Examples of this Embodiment 2

Example 2-1

(Preparation of Silanol Composition)

28 g of distilled water, 960 mL of tetrahydrofuran (manufactured by Wako Pure Chemical Industries, Ltd.), and 3.7 g of Pd/C (10% palladium-carbon, manufactured by N.E. CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of Pd/C (10% palladium/carbon) was added three times, and the reaction was performed for a total of 17 h. For the disappearance of the SiH groups, with the reaction liquid, $^1$H-NMR was measured with a deuterated acetone solution of the reaction liquid at a concentration of 1 wt % using an NMR (ECZ400S) manufactured by JEOL Ltd., and the disappearance of the SiH groups present at 4 to 5 ppm was confirmed.

75 g of magnesium sulfate was added to the reaction liquid, and the mixture was stirred at 5° C. for 30 min. A funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution. This solution was concentrated in a water bath at 15° C. using an evaporator to a remaining amount of 587 g (649 mL) and introduced into a mixed solvent of 217 mL of tetrahydrofuran and 4.4 L of dichloromethane. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure, and concentrated until it became a tetrahydrofuran-dichloromethane mixed solution of 10 wt % of a silanol composition. 10 g of the tetrahydrofuran-dichloromethane mixed solution of 10 wt % of the silanol composition was concentrated to 1 g under reduced pressure, and then 100 g of isopropanol was added again. Further, the mixture was concentrated under reduced pressure again to make the silanol composition (isopropanol solution) at a predetermined concentration.

Figure 3:
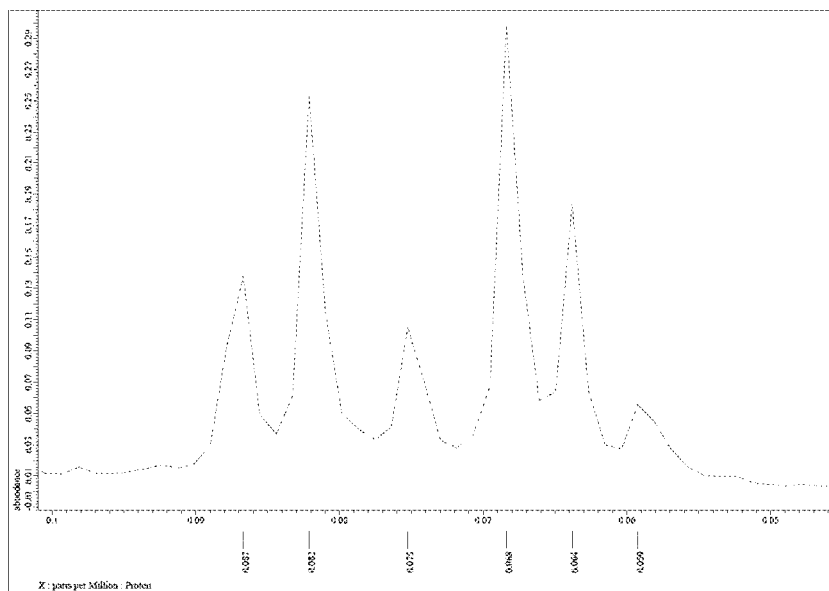
FIG. 3 is a diagram showing the $^1$H-NMR spectrum used when calculating the proportions of the stereoisomers of the silanol composition obtained in Example 2-1.

The physical properties such as haze were evaluated using the obtained silanol composition. In addition, the proportions of the stereoisomers of the cyclic silanol were calculated by $^1$H-NMR. The $^1$H-NMR spectrum is shown in FIG. 3.

(Preparation of Cured Product)

The silanol composition obtained above was thermally cured at 100° C. for 2 h to obtain a cured product.

(Preparation of Modified Cured Product)

Further, the cured product was irradiated with light in a state of adhering closely to the light source of a UVC ozone treatment apparatus manufactured by SEN LIGHTS CORPORATION, to obtain a modified cured product. The crack resistance after 1000 h of light irradiation was visually evaluated, and a modified cured product in which no cracks occurred was ○, and a modified cured product in which cracks occurred was X.

Figure 5:
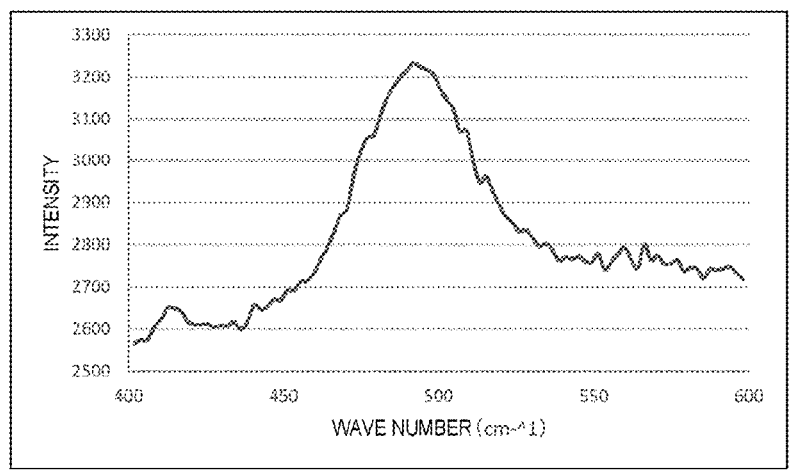
FIG. 5 is a diagram showing the Raman spectrum of the cured product obtained in Example 2-1.
Figure 6:
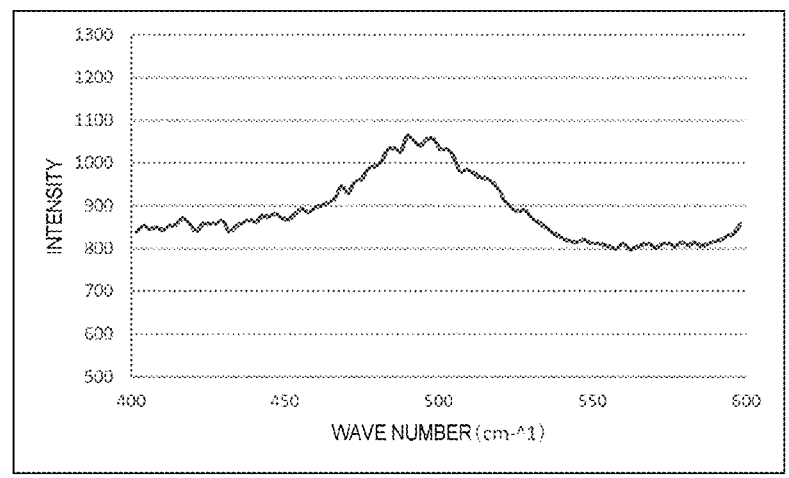
FIG. 6 is a diagram showing the Raman spectrum of the modified cured product obtained in Example 2-1.

In addition, the Raman spectra of the cured product and the modified cured product were measured using a laser Raman microscope. The Raman spectrum of the cured product is shown in FIG. 5, and the Raman spectrum of the modified cured product is shown in FIG. 6.

Further, a peak top in the range of 2800 to 3000 cm$^{-1}$ was observed to confirm the presence or absence of methyl groups. As a result of analysis by ATR-IR, the obtained modified cured product comprised a site in which the conversion rate from methyl groups into hydroxyl groups due to light irradiation was 100%. The site was a place at a position directly under the light source where the irradiation intensity was considered to be highest.

Example 2-2

The same experiments as in Example 2-1 were performed except that the all-trans form (cyclic silanol (B4)) prepared in the above (Preparation of Stereoisomers) was added to the silanol composition (isopropanol solution) made in Example 2-1, and the all-trans form ratio was 43%.

Example 2-3

The same experiments as in Example 2-1 were performed except that the all-trans form (cyclic silanol (B4)) prepared in the above (Preparation of Stereoisomers) was added to the silanol composition (isopropanol solution) made in Example 2-1, and the all-trans form ratio was 56%.

Example 2-4

The same experiments as in Example 2-1 were performed except that the all-cis form (cyclic silanol (B1)) prepared in the above (Preparation of Stereoisomers) was added to the silanol composition (isopropanol solution) made in Example 2-1, and the all-cis form ratio was 31%.

Example 2-5

The same experiments as in Example 2-1 were performed except that the all-cis form (cyclic silanol (B1)) prepared in the above (Preparation of Stereoisomers) was added to the silanol composition (isopropanol solution) made in Example 2-1, and the all-cis form ratio was 41%.

Example 2-6

The same experiments as in Example 2-1 were performed except that the trans-trans-cis form (cyclic silanol (B3)) prepared in the above (Preparation of Stereoisomers) was added to the silanol composition (isopropanol solution) made in Example 2-1, and the trans-trans-cis form ratio was 66%.

Example 2-7

Figure 4:
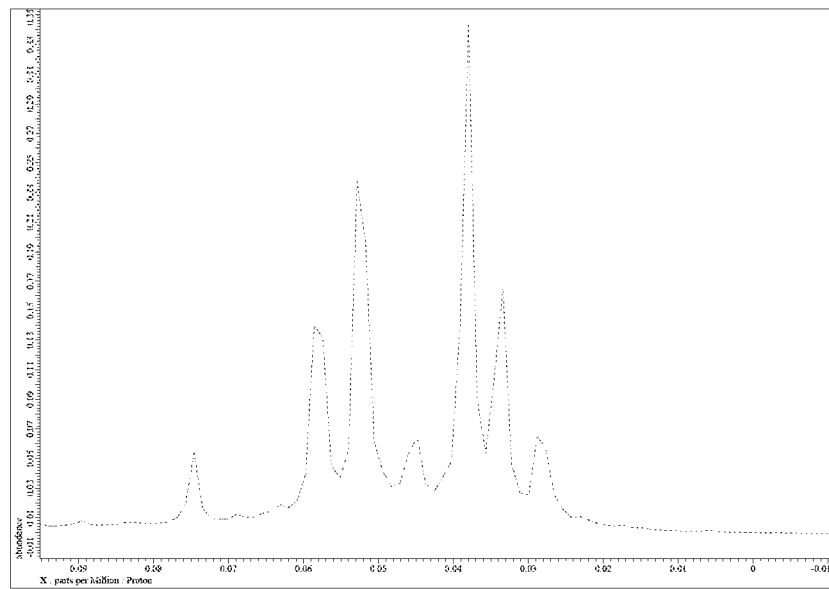
FIG. 4 is a diagram showing the $^1$H-NMR spectrum used when calculating the proportions of the stereoisomers of the silanol composition obtained in Example 2-7.

The same experiments as in Example 2-1 were performed except that the recrystallization temperature in Example 2-1 was −40° C. The $^1$H-NMR spectrum is shown in FIG. 4.

Example 2-8

The same experiments as in Example 2-1 were performed except that the curing temperature in Example 2-1 was 120° C.

Example 2-9

The same experiments as in Example 2-1 were performed except that the curing temperature in Example 2-1 was 150° C.

Example 2-10

The same experiments as in Example 2-1 were performed except that the curing temperature in Example 2-1 was 180° C.

Comparative Example 2-1

The same experiments as in Example 2-1 were performed except using a methylsiloxane cured product obtained by heating at 180° C. for 2 h a solution obtained by mixing methyltrimethoxysilane (TOKYO CHEMICAL INDUSTRY CO., LTD.), acetic acid, water, and ethanol and then stirring the mixture at room temperature for 24 h.

The physical properties and evaluation results of the silanol compositions and the cured products obtained in the Examples and the Comparative Examples are shown in Table 3 and Table 4.

TABLE 3

|  | Example 2-1 | Example 2-2 | Example 2-3 | Example 2-4 | Example 2-5 |
|---|---|---|---|---|---|
| Starting material; cyclic siloxane | D4H | D4H | D4H | D4H | D4H |
| Proportion of all-cis cyclic silanol (%) | 6 | 4 | 3 | 31 | 41 |
| Proportion of cis-trans-cis cyclic silanol (%) | 12 | 10 | 12 | 9 | 8 |
| Proportion of all-trans cyclic silanol (%) | 25 | 43 | 56 | 17 | 14 |
| Proportion of trans-trans-cis cyclic silanol (%) | 57 | 43 | 29 | 43 | 37 |
| (A2)/[(A1) + (A2)] area ratio (%) | 20 | 20 | 20 | 20 | 20 |
| Residual transition metal (Pd) content (ppm by mass) | <1 | <1 | <1 | <1 | <1 |
| Recrystallization temperature (° C.) | 5 | 5 | 5 | 5 | 5 |
| Adhesive force | Adhered | Adhered | Adhered | Adhered | Adhered |
| Film thickness (μm) | 3 | 3 | 3 | 3 | 3 |
| Haze of silanol composition (%) | 0.2 | 0.4 | 1 | 0.2 | 0.2 |

TABLE 3-continued

|  | | | | | |
|---|---|---|---|---|---|
| Haze of cured product of silanol composition (%) | 0.2 | 1 | 1 | 0.2 | 0.2 |
| Curing temperature (° C.) | 100 | 100 | 100 | 100 | 100 |
| Curing time (h) | 2 | 2 | 2 | 2 | 2 |
| Raman spectrum wave number derived from siloxane skeleton of cured product (cm−1) | 494 | 488 | 488 | 491 | 491 |
| Raman spectrum wave number derived from siloxane skeleton of modified cured product (cm−1) | 492 | 488 | 490 | 491 | 491 |
| Raman spectrum 2800-3000(cm−1) presence or absence of methyl groups | Absent | Absent | Absent | Absent | Absent |
| Crack resistance after light irradiation | ◯ | ◯ | ◯ | ◯ | ◯ |

| | Example 2-6 | Example 2-7 | Example 2-8 | Example 2-9 | Example 2-10 |
|---|---|---|---|---|---|
| Starting material; cyclic siloxane | D4H | D4H | D4H | D4H | D4H |
| Proportion of all-cis cyclic silanol (%) | 5 | 7 | 6 | 6 | 6 |
| Proportion of cis-trans-cis cyclic silanol (%) | 13 | 4 | 12 | 12 | 12 |
| Proportion of all-trans cyclic silanol (%) | 16 | 27 | 25 | 25 | 25 |
| Proportion of trans-trans-cis cyclic silanol (%) | 66 | 62 | 57 | 57 | 57 |
| (A2)/[(A1) + (A2)] area ratio (%) | 20 | 20 | 20 | 20 | 20 |
| Residual transition metal (Pd) content (ppm by mass) | <1 | <1 | <1 | <1 | <1 |
| Recrystallization temperature (° C.) | 5 | −40 | 5 | 5 | 5 |
| Adhesive force | Adhered | Adhered | Adhered | Adhered | Adhered |
| Film thickness (μm) | 3 | 3 | 3 | 3 | 3 |
| Haze of silanol composition (%) | 1 | 0.1 | 0.2 | 0.2 | 0.2 |
| Haze of cured product of silanol composition (%) | 1 | 0.1 | 0.2 | 0.2 | 0.2 |
| Curing temperature (° C.) | 100 | 100 | 120 | 150 | 180 |
| Curing time (h) | 2 | 2 | 2 | 2 | 2 |
| Raman spectrum wave number derived from siloxane skeleton of cured product (cm−1) | 490 | 490 | 490 | 490 | 490 |
| Raman spectrum wave number derived from siloxane skeleton of modified cured product (cm−1) | 490 | 490 | 490 | 490 | 490 |
| Raman spectrum 2800-3000(cm−1) presence or absence of methyl groups | Absent | Absent | Absent | Absent | Absent |
| Crack resistance after light irradiation | ◯ | ◯ | ◯ | ◯ | ◯ |

TABLE 4

| | Comparative Example 2-1 |
|---|---|
| Starting material; cyclic siloxane | — |
| Proportion of all-cis cyclic silanol (%) | — |
| Proportion of cis-trans-cis cyclic silanol (%) | — |
| Proportion of all-trans cyclic silanol (%) | — |
| Proportion of trans-trans-cis cyclic silanol (%) | — |
| (A2)/[(A1) + (A2)] area ratio (%) | — |
| Residual transition metal (Pd) content (ppm by mass) | — |
| Recrystallization temperature (° C.) | — |
| Adhesive force | Adhered |
| Film thickness (μm) | 3 |
| Haze of composition (%) | 0.2 |
| Haze of cured product (%) | 0.2 |
| Curing temperature (° C.) | 180 |
| Curing time (h) | 2 |
| Raman spectrum wave number derived from siloxane skeleton after curing (cm−1) | 463 |
| Raman spectrum wave number derived from siloxane skeleton of modified cured product (cm−1) | 495 |
| Raman spectrum 2800-3000(cm−1) presence or absence of methyl groups | Absent |
| Crack resistance after light irradiation | X |

Examples of this Embodiment 3

Example 3-1

(Preparation of Silanol Composition)

28 g of distilled water, 960 mL of tetrahydrofuran (manufactured by Wako Pure Chemical Industries, Ltd.), and 3.7 g of Pd/C (10% palladium/carbon, manufactured by N.E. CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of Pd/C (10% palladium/carbon) was added three times, and the reaction was performed for a total of 17 h. For the disappearance of the SiH groups, with the reaction liquid, $^1$H-NMR was measured with a deuterated acetone solution of the reaction liquid at a concentration of 1% by mass using an NMR (ECZ400S) manufactured by JEOL Ltd., and the disappearance of the SiH groups present at 4 to 5 ppm was confirmed.

75 g of magnesium sulfate was added to the reaction liquid, and the mixture was stirred at 5° C. for 30 min. A funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution. This solution was concentrated in a water bath at 15° C. using an evaporator to a remaining amount of 587 g (649 mL) and introduced into a mixed solvent of 217 mL of tetrahydrofuran and 4.4 L of dichloromethane. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure, and concentrated until it became a tetrahydrofuran-dichloromethane mixed solution of 10% by mass of a silanol composition. 10 g of the tetrahydrofuran-dichloromethane mixed solution of 10% by mass of the silanol composition was concentrated to 1 g under reduced pressure, and then 100 g of isopropanol was added again. Further, the mixture was concentrated under reduced pressure again to make the silanol composition (isopropanol solution) at a predetermined concentration.

Figure 7:
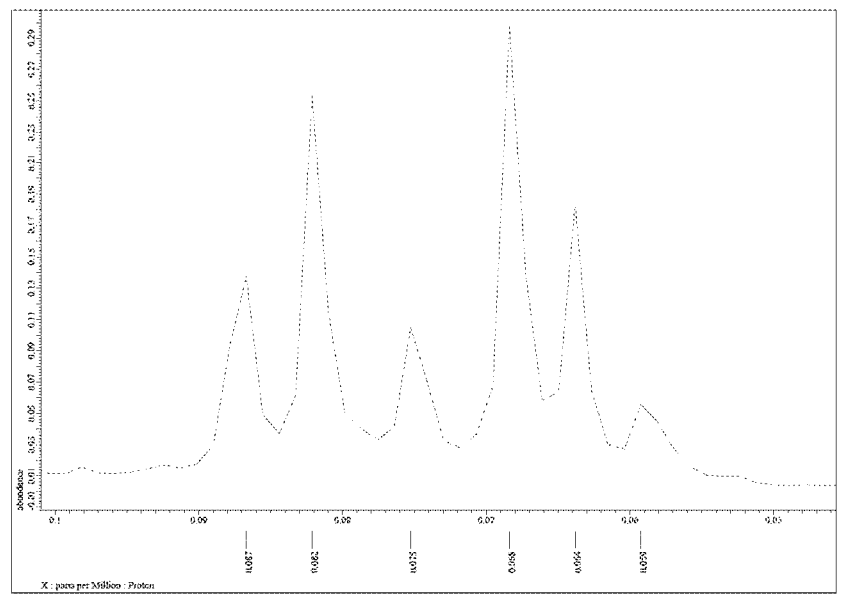
FIG. 7 is a diagram showing the $^1$H-NMR spectrum used when calculating the proportions of the stereoisomers of the silanol composition obtained in Example 3-1.

The physical properties such as haze were evaluated using the obtained silanol composition. In addition, the proportions of the stereoisomers of the cyclic silanol were calculated by $^1$H-NMR. The $^1$H-NMR spectrum is shown in FIG. 7.

(Preparation of Cured Product)

The silanol composition obtained above was thermally cured at 100° C. for 2 h to obtain a cured product.

(Preparation of Modified Cured Product)

Further, the cured product was irradiated with light in a state of adhering closely to the light source of a UVC ozone treatment apparatus manufactured by SEN LIGHTS CORPORATION, to obtain a modified cured product. The crack resistance after 1000 h of light irradiation was evaluated by an optical microscope, and a modified cured product in which no cracks occurred was ○, and a modified cured product in which cracks occurred was X.

In addition, the hardness and Young's modulus of the cured product and the modified cured product were measured using a nanoindenter. Further, as a result of analysis by ATR-IR, the obtained modified cured product comprised a site in which the conversion rate from methyl groups into hydroxyl groups due to light irradiation was 100%. The site was a place at a position directly under the light source where the irradiation intensity was considered to be highest.

Example 3-2

The same experiments as in Example 3-1 were performed except that the all-trans form (cyclic silanol (B4)) prepared in the above (Preparation of Stereoisomers) was added to the silanol composition (isopropanol solution) made in Example 3-1, and the all-trans form ratio was 43%.

Example 3-3

The same experiments as in Example 3-1 were performed except that the all-trans form (cyclic silanol (B4)) prepared in the above (Preparation of Stereoisomers) was added to the silanol composition (isopropanol solution) made in Example 3-1, and the all-trans form ratio was 56%.

Example 3-4

The same experiments as in Example 3-1 were performed except that the all-cis form (cyclic silanol (B1)) prepared in the above (Preparation of Stereoisomers) was added to the silanol composition (isopropanol solution) made in Example 3-1, and the all-cis form form ratio was 31%.

Example 3-5

The same experiments as in Example 3-1 were performed except that the all-cis form (cyclic silanol (B1)) prepared in the above (Preparation of Stereoisomers) was added to the silanol composition (isopropanol solution) made in Example 3-1, and the all-cis form ratio was 41%.

Example 3-6

The same experiments as in Example 3-1 were performed except that the trans-trans-cis form (cyclic silanol (B3)) prepared in the above (Preparation of Stereoisomers) was added to the silanol composition (isopropanol solution) made in Example 3-1, and the trans-trans-cis form ratio was 66%.

Example 3-7

Figure 8:
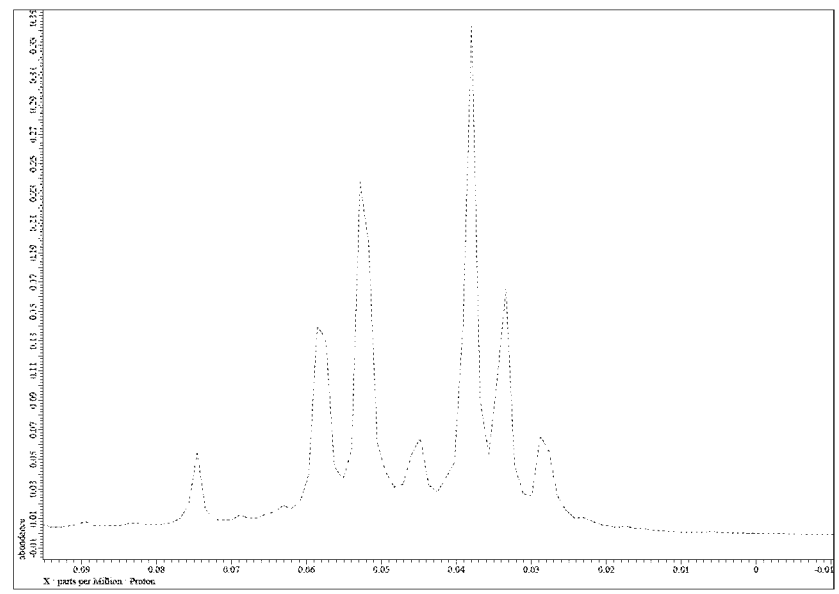
FIG. 8 is a diagram showing the $^1$H-NMR spectrum used when calculating the proportions of the stereoisomers of the silanol composition obtained in Example 3-7.

The same experiments as in Example 3-1 were performed except that the recrystallization temperature in Example 3-1 was −40° C. The $^1$H-NMR spectrum is shown in FIG. 8.

Example 3-8

The same experiments as in Example 3-1 were performed except that the temperature of thermal curing in Example 3-1 was 120° C.

Example 3-9

The same experiments as in Example 3-1 were performed except that the temperature of thermal curing in Example 3-1 was 150° C.

Example 3-10

The same experiments as in Example 3-1 were performed except that the temperature of thermal curing in Example 3-1 was 180° C.

Comparative Example 3-1

The same experiments as in Example 3-1 were performed except that a dimethyl silicone resin (JCR6122 manufactured by Dow Corning Toray Co., Ltd.) was used instead of the silanol composition, and the curing temperature was 150° C. for 2 h.

Comparative Example 3-2

The same experiments as in Example 3-1 were performed except that the temperature of thermal curing in Example 3-1 was 210° C., and the curing time was 24 h.

The physical properties and evaluation results of the silanol compositions and the cured products obtained in the Examples and the Comparative Examples are shown in Table 5 and Table 6.

TABLE 5

|  | Example 3-1 | Example 3-2 | Example 3-3 | Example 3-4 | Example 3-5 |
|---|---|---|---|---|---|
| Starting material; cyclic siloxane | D4H | D4H | D4H | D4H | D4H |
| Proportion of all-cis cyclic silanol (%) | 6 | 4 | 3 | 31 | 41 |
| Proportion of cis-trans-cis cyclic silanol (%) | 12 | 10 | 12 | 9 | 8 |
| Proportion of all-trans cyclic silanol (%) | 25 | 43 | 56 | 17 | 14 |
| Proportion of trans-trans-cis cyclic silanol (%) | 57 | 43 | 29 | 43 | 37 |

TABLE 5-continued

|  | | | | | |
|---|---|---|---|---|---|
| (A2)/[(A1) + (A2)] area ratio (%) | 20 | 20 | 20 | 20 | 20 |
| Residual transition metal (Pd) content (ppm by mass) | <1 | <1 | <1 | <1 | <1 |
| Recrystallization temperature (° C.) | 5 | 5 | 5 | 5 | 5 |
| Adhesive force | Adhered | Adhered | Adhered | Adhered | Adhered |
| Film thickness (μm) | 3 | 3 | 3 | 3 | 3 |
| Haze of silanol composition (%) | 0.2 | 0.4 | 1 | 0.2 | 0.2 |
| Haze of cured product of silanol composition (%) | 0.2 | 1 | 1 | 0.2 | 0.2 |
| Curing temperature (° C.) | 100 | 100 | 100 | 100 | 100 |
| Curing time (h) | 2 | 2 | 2 | 2 | 2 |
| Hardness of cured product (GPa) | 0.34 | 0.4 | 0.4 | 0.3 | 0.3 |
| Young's modulus of cured product (GPa) | 2.6 | 2.6 | 2.6 | 2.6 | 2.6 |
| Hardness of modified cured product (GPa) | 2.1 | 2.2 | 2.2 | 2 | 2 |
| Young's modulus of modified cured product (GPa) | 28 | 28 | 28 | 28 | 28 |
| Hardness of modified cured product/hardness of cured product | 6 | 6 | 6 | 7 | 7 |
| Young's modulus of modified cured product/ Young's modulus of cured product | 11 | 11 | 11 | 11 | 11 |
| Crack resistance after light irradiation | ○ | ○ | ○ | ○ | ○ |

|  | Example 3-6 | Example 3-7 | Example 3-8 | Example 3-9 | Example 3-10 |
|---|---|---|---|---|---|
| Starting material; cyclic siloxane | D4H | D4H | D4H | D4H | D4H |
| Proportion of all-cis cyclic silanol (%) | 5 | 7 | 6 | 6 | 6 |
| Proportion of cis-trans-cis cyclic silanol (%) | 13 | 4 | 12 | 12 | 12 |
| Proportion of all-trans cyclic silanol (%) | 16 | 27 | 25 | 25 | 25 |
| Proportion of trans-trans-cis cyclic silanol (%) | 66 | 62 | 57 | 57 | 57 |
| (A2)/[(A1) + (A2)] area ratio (%) | 20 | 20 | 20 | 20 | 20 |
| Residual transition metal (Pd) content (ppm by mass) | <1 | <1 | <1 | <1 | <1 |
| Recrystallization temperature (° C.) | 5 | −40 | 5 | 5 | 5 |
| Adhesive force | Adhered | Adhered | Adhered | Adhered | Adhered |
| Film thickness (μm) | 3 | 3 | 3 | 3 | 3 |
| Haze of silanol composition (%) | 1 | 0.1 | 0.2 | 0.2 | 0.2 |
| Haze of cured product of silanol composition (%) | 1 | 0.1 | 0.2 | 0.2 | 0.2 |
| Curing temperature (° C.) | 100 | 100 | 120 | 150 | 180 |
| Curing time (h) | 2 | 2 | 2 | 2 | 2 |
| Hardness of cured product (GPa) | 0.35 | 0.34 | 0.5 | 0.6 | 0.7 |
| Young's modulus of cured product (GPa) | 2.6 | 2.6 | 2.6 | 2.6 | 2.6 |
| Hardness of modified cured product (GPa) | 2.1 | 2.2 | 2.1 | 2.1 | 2.1 |
| Young's modulus of modified cured product (GPa) | 28 | 28 | 28 | 28 | 28 |
| Hardness of modified cured product/hardness of cured product | 6 | 6 | 4 | 4 | 3 |
| Young's modulus of modified cured product/ Young's modulus of cured product | 11 | 11 | 11 | 11 | 11 |
| Crack resistance after light irradiation | ○ | ○ | ○ | ○ | ○ |

TABLE 6

|  | Comparative Example 3-1 | Comparative Example 3-2 |
|---|---|---|
| Starting material; cyclic siloxane | — | D4H |
| Proportion of all-cis cyclic silanol (%) | — | 6 |
| Proportion of cis-trans-cis cyclic silanol (%) | — | 12 |
| Proportion of all-trans cyclic silanol (%) | — | 25 |
| Proportion of trans-trans-cis cyclic silanol (%) | — | 57 |
| (A2)/[(A1) + (A2)] area ratio (%) | — | 20 |
| Residual transition metal (Pd) content (ppm by mass) | — | <1 |
| Recrystallization temperature (° C.) | — | 5 |
| Adhesive force | — | Adhered |
| Film thickness (μm) | — | 3 |
| Haze of composition (%) | 0.2 | 0.2 |
| Haze of cured product of composition (%) | 0.2 | 0.2 |
| Curing temperature (° C.) | 150 | 210 |
| Curing time (h) | 2 | 24 |
| Hardness of cured product (GPa) | 0.002 | 1.1 |
| Young's modulus of cured product (GPa) | 0.003 | 10.1 |
| Hardness of modified cured product (GPa) | 1.3 | 2.1 |
| Young's modulus of modified cured product (GPa) | 29 | 28 |
| Hardness of modified cured product/hardness of cured product | 650 | 2 |
| Young's modulus of modified cured product/ Young's modulus of cured product | 9667 | 3 |
| Crack resistance after light irradiation | X | X |

Examples of this Embodiment 4

Example 4-1

(Preparation of Silanol Composition)

28 g of distilled water, 960 mL of tetrahydrofuran (manufactured by Wako Pure Chemical Industries, Ltd.), and 3.7 g of Pd/C (10% palladium/carbon, manufactured by N.E. CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of Pd/C (10% palladium/carbon) was added three times, and the reaction was performed for a total of 17 h. For the disappearance of the SiH groups, with the reaction liquid, $^1$H-NMR was measured with a deuterated acetone solution of the reaction liquid at a concentration of 1 wt % using an NMR (ECZ400S) manufactured by JEOL Ltd., and the disappearance of the SiH groups present at 4 to 5 ppm was confirmed.

75 g of magnesium sulfate was added to the reaction liquid, and the mixture was stirred at 5° C. for 30 min. A funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution. This solution was concentrated in a water bath at 15° C. using an evaporator to a remaining amount of 587 g (649 mL) and introduced into a mixed solvent of 217 mL of tetrahydrofuran and 4.4 L of dichloromethane. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure, and concentrated until it became a tetrahydrofuran-dichloromethane mixed solution of 10 wt % of a silanol composition. 10 g of the tetrahydrofuran-dichloromethane mixed solution of 10 wt % of the silanol composition was concentrated to 1 g under reduced pressure, and then 100 g of isopropanol was added again. Further, the mixture was concentrated under reduced pressure again to make the silanol composition (isopropanol solution) at a predetermined concentration.

Figure 9:
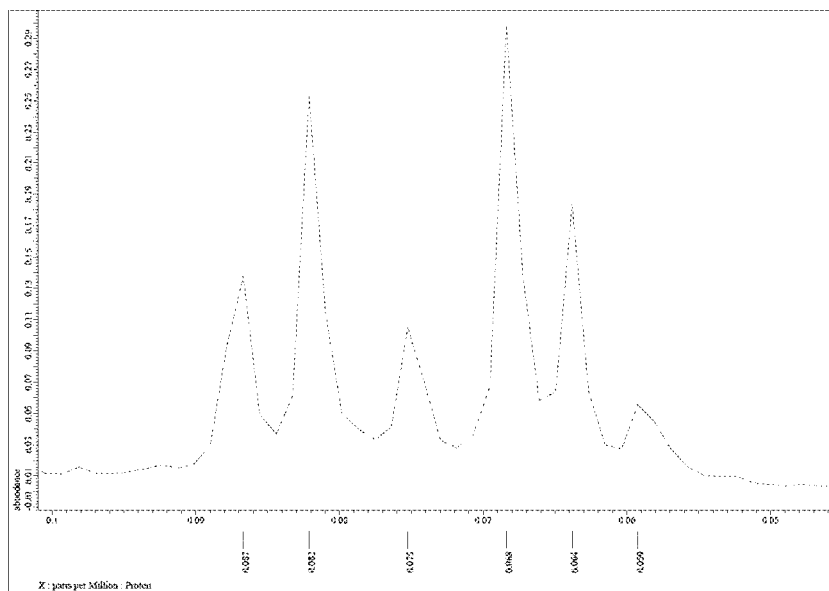
FIG. 9 is a diagram showing the $^1$H-NMR spectrum used when calculating the proportions of the stereoisomers of the silanol composition obtained in Example 4-1.

The physical properties such as haze were evaluated using the obtained silanol composition. In addition, the proportions of the stereoisomers of the cyclic silanol were calculated by $^1$H-NMR. The $^1$H-NMR spectrum is shown in FIG. 9.

(Preparation of Cured Product)

The silanol composition obtained above was applied to an aluminum nitride plate 0.8 mm square using a dispenser, and a hemispherical quartz lens having a diameter of 2 mm was pushed with a pressing force of 400 g for 3 s. The silanol composition was thermally cured at 100° C. for 2 h to make a light irradiation sample in which a cured product having a film thickness of 1 μm was sandwiched between the aluminum nitride plate and the hemispherical quartz lens.

(Preparation of Modified Cured Product)

Further, the light irradiation sample was irradiated with light in a state of adhering closely to the light source of a UVC ozone treatment apparatus manufactured by SEN LIGHTS CORPORATION, to obtain a modified cured product. The crack resistance after 1000 h of light irradiation was visually evaluated, and a modified cured product in which no cracks occurred was ○, and a modified cured product in which cracks occurred was X.

As a result of analysis by ATR-IR, the obtained modified cured product comprised a site in which the conversion rate from methyl groups into hydroxyl groups due to light irradiation was 100%. The site was a place at a position directly under the light source where the irradiation intensity was considered to be highest.

Example 4-2

The same experiments as in Example 4-1 were performed except that the all-trans form (cyclic silanol (B4)) prepared in the above (Preparation of Stereoisomers) was added to the silanol composition (isopropanol solution) made in Example 4-1, and the all-trans form ratio was 43%.

Example 4-3

The same experiments as in Example 4-1 were performed except that the all-trans form (cyclic silanol (B4)) prepared in the above (Preparation of Stereoisomers) was added to the silanol composition (isopropanol solution) made in Example 4-1, and the all-trans form ratio was 56%.

Example 4-4

The same experiments as in Example 4-1 were performed except that the all-cis form (cyclic silanol (B1)) prepared in the above (Preparation of Stereoisomers) was added to the silanol composition (isopropanol solution) made in Example 4-1, and the all-cis form ratio was 31's.

Example 4-5

The same experiments as in Example 4-1 were performed except that the all-cis form (cyclic silanol (B1)) prepared in the above (Preparation of Stereoisomers) was added to the silanol composition (isopropanol solution) made in Example 4-1, and the all-cis form ratio was 41%.

Example 4-6

The same experiments as in Example 4-1 were performed except that the trans-trans-cis form (cyclic silanol (B3)) prepared in the above (Preparation of Stereoisomers) was added to the silanol composition (isopropanol solution) made in Example 4-1, and the trans-trans-cis form ratio was 66%.

Example 4-7

Figure 10:
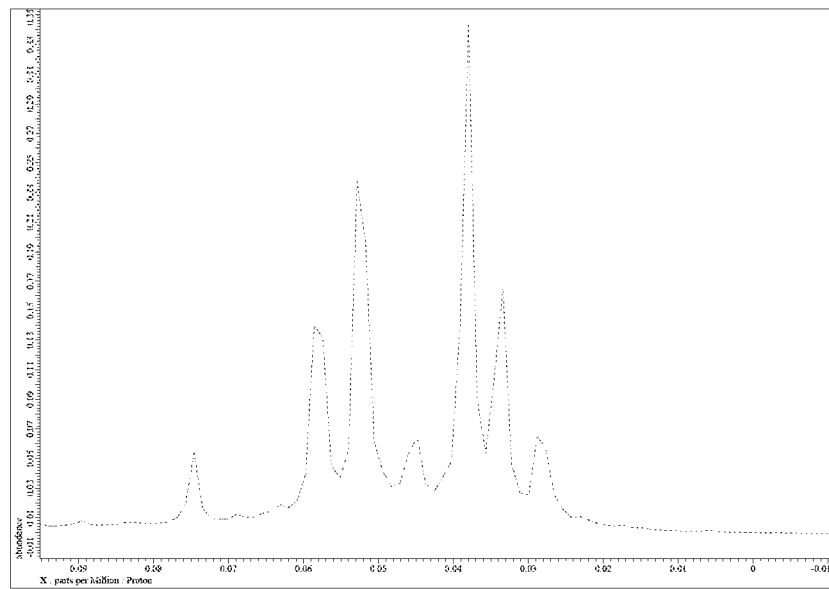
FIG. 10 is a diagram showing the $^1$H-NMR spectrum used when calculating the proportions of the stereoisomers of the silanol composition obtained in Example 4-7.

The same experiments as in Example 4-1 were performed except that the recrystallization temperature in Example 4-1 was −40° C. The $^1$H-NMR spectrum is shown in FIG. 10.

Example 4-8

The same experiments as in Example 4-1 were performed except that the cured product film thickness in Example 4-1 was 0.5 μm.

Example 4-9

The same experiments as in Example 4-1 were performed except that the cured product film thickness in Example 4-1 was 0.2 μm.

Example 4-10

The same experiments as in Example 4-1 were performed except that the cured product film thickness in Example 4-1 was 0.1 μm.

Example 4-11

The same experiments as in Example 4-1 were performed except that the cured product film thickness in Example 4-1 was 2 μm.

Comparative Example 4-1

The same experiments as in Example 4-1 were performed except that the cured product film thickness in Example 4-1 was 3 μm.

Comparative Example 4-2

The same experiments as in Example 4-1 were performed except that the cured product film thickness in Example 4-1 was 10 μm.

The physical properties and evaluation results of the silanol compositions and the cured products obtained in the Examples and the Comparative Examples are shown in Table 7 and Table 8.

TABLE 7

|  | Example 4-1 | Example 4-2 | Example 4-3 | Example 4-4 | Example 4-5 | Example 4-6 |
|---|---|---|---|---|---|---|
| Starting material; cyclic siloxane | D4H | D4H | D4H | D4H | D4H | D4H |
| Proportion of all-cis cyclic silanol (%) | 6 | 4 | 3 | 31 | 41 | 5 |
| Proportion of cis-trans-cis cyclic silanol (%) | 12 | 10 | 12 | 9 | 8 | 13 |
| Proportion of all-trans cyclic silanol (%) | 25 | 43 | 56 | 17 | 14 | 16 |
| Proportion of trans-trans-cis cyclic silanol (%) | 57 | 43 | 29 | 43 | 37 | 66 |
| (A2)/[(A1) + (A2)] area ratio (%) | 20 | 20 | 20 | 20 | 20 | 20 |
| Residual transition metal (Pd) content (ppm by mass) | <1 | <1 | <1 | <1 | <1 | <1 |
| Recrystallization temperature (° C.) | 5 | 5 | 5 | 5 | 5 | 5 |
| Adhesive force | Adhered | Adhered | Adhered | Adhered | Adhered | Adhered |
| Film thickness (μm) | 1 | 1 | 1 | 1 | 1 | 1 |
| Haze of silanol composition (%) | 0.2 | 0.4 | 1 | 0.2 | 0.2 | 1 |
| Haze of cured product of silanol composition (%) | 0.2 | 1 | 1 | 0.2 | 0.2 | 1 |
| Curing temperature (° C.) | 100 | 100 | 100 | 100 | 100 | 100 |
| Curing time (h) | 2 | 2 | 2 | 2 | 2 | 2 |
| Crack resistance | ○ | ○ | ○ | ○ | ○ | ○ |

|  | Example 4-7 | Example 4-8 | Example 4-9 | Example 4-10 | Example 4-11 |
|---|---|---|---|---|---|
| Starting material; cyclic siloxane | D4H | D4H | D4H | D4H | D4H |
| Proportion of all-cis cyclic silanol (%) | 7 | 6 | 6 | 6 | 6 |
| Proportion of cis-trans-cis cyclic silanol (%) | 4 | 12 | 12 | 12 | 12 |
| Proportion of all-trans cyclic silanol (%) | 27 | 25 | 25 | 25 | 25 |
| Proportion of trans-trans-cis cyclic silanol (%) | 62 | 57 | 57 | 57 | 57 |
| (A2)/[(A1) + (A2)] area ratio (%) | 20 | 20 | 20 | 20 | 20 |
| Residual transition metal (Pd) content (ppm by mass) | <1 | <1 | <1 | <1 | <1 |
| Recrystallization temperature (° C.) | −40 | 5 | 5 | 5 | 5 |
| Adhesive force | Adhered | Adhered | Adhered | Adhered | Adhered |
| Film thickness (μm) | 1 | 0.5 | 0.2 | 0.1 | 2 |
| Haze of silanol composition (%) | 0.1 | 0.2 | 0.2 | 0.2 | 0.2 |
| Haze of cured product of silanol composition (%) | 0.1 | 0.2 | 0.2 | 0.2 | 0.2 |
| Curing temperature (° C.) | 100 | 100 | 100 | 100 | 100 |
| Curing time (h) | 2 | 2 | 2 | 2 | 2 |
| Crack resistance | ○ | ○ | ○ | ○ | ○ |

TABLE 8

|  | Comparative Example 4-1 | Comparative Example 4-2 |
|---|---|---|
| Starting material; cyclic siloxane | D4H | D4H |
| Proportion of all-cis cyclic silanol (%) | 6 | 6 |
| Proportion of cis-trans-cis cyclic silanol (%) | 12 | 12 |
| Proportion of all-trans cyclic silanol (%) | 25 | 25 |
| Proportion of trans-trans-cis cyclic silanol (%) | 57 | 57 |
| (A2)/[(A1) + (A2)] area ratio (%) | 20 | 20 |
| Residual transition metal (Pd) content (ppm by mass) | <1 | <1 |
| Recrystallization temperature (° C.) | 5 | 5 |
| Adhesive force | Adhered | Adhered |
| Film thickness (μm) | 3 | 10 |
| Haze of composition (%) | 0.2 | 0.2 |
| Haze of cured product (%) | 0.2 | 0.2 |
| Curing temperature (° C.) | 100 | 100 |
| Curing time (h) | 2 | 2 |
| Crack resistance | X | X |

Examples of this Embodiment 5

Example 5-1

(Preparation of Silanol Composition)

28 g of distilled water, 960 mL of tetrahydrofuran (manufactured by Wako Pure Chemical Industries, Ltd.), and 3.7 g of Pd/C (10% palladium/carbon, manufactured by N.E. CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of Pd/C (10% palladium/carbon) was added three times, and the reaction was performed for a total of 17 h. For the disappearance of the SiH groups, with the reaction liquid, $^1$H-NMR was measured with a deuterated acetone solution of the reaction liquid at a concentration of 1 wt % using an NMR (ECZ400S) manufactured by JEOL Ltd., and the disappearance of the SiH groups present at 4 to 5 ppm was confirmed.

75 g of magnesium sulfate was added to the reaction liquid, and the mixture was stirred at 5° C. for 30 min. A funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution. This solution was concentrated in a water bath at 15° C. using an evaporator to a remaining amount of 587 g (649 mL) and introduced into a mixed solvent of 217 mL of tetrahydrofuran and 4.4 L of dichloromethane. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure, and concentrated until it became a tetrahydrofuran-dichloromethane mixed solution of 10 wt % of a silanol composition. 10 g of the tetrahydrofuran-dichloromethane mixed solution of 10 wt % of the silanol composition was concentrated to 1 g under reduced pressure, and then 100 g of isopropanol was added again. Further, the mixture was concentrated under reduced pressure again to make the silanol composition (isopropanol solution) at a predetermined concentration.

Figure 11:
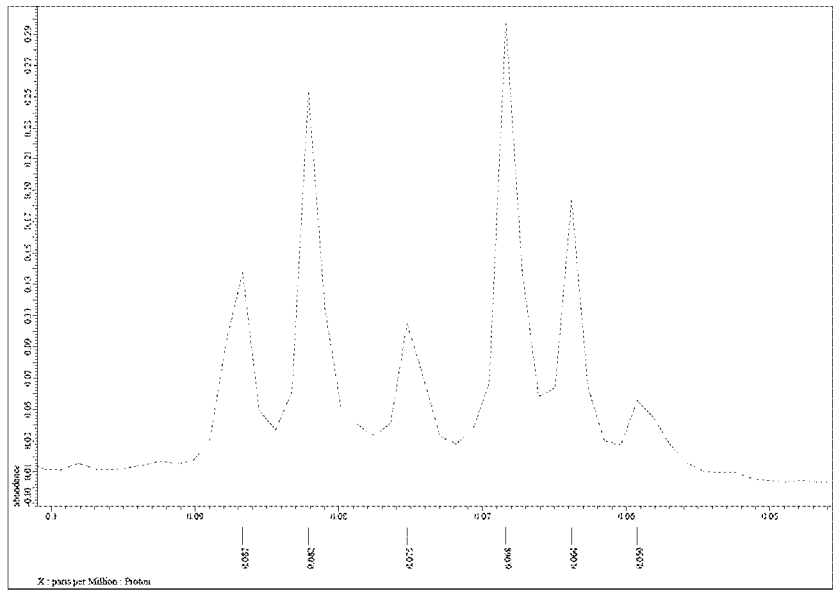
FIG. 11 is a diagram showing the $^1$H-NMR spectrum used when calculating the proportions of the stereoisomers of the silanol composition obtained in Example 5-1.

The physical properties such as haze were evaluated using the obtained silanol composition. In addition, the proportions of the stereoisomers of the cyclic silanol were calculated by $^1$H-NMR. The $^1$H-NMR spectrum is shown in FIG. 11.

(Preparation of Cured Product)

The silanol composition obtained above was thermally cured at 100° C. for 2 h to obtain a cured product.

(Preparation of Modified Cured Product)

Further, the cured product was irradiated with light in a state of adhering closely to the light source of a UVC ozone treatment apparatus manufactured by SEN LIGHTS CORPORATION, to obtain a modified cured product. Of 10 modified cured products made, the number of those in which no cracks occurred was counted. In addition, the IR of the cured product and the modified cured product was measured, and the SiO—H stretching/Si—O—Si stretching area ratio, the Si-methyl stretching/Si—O—Si stretching area ratio, the peak wave number of Si—OH stretching vibration, the peak height of the Si—OH stretching vibration, a, and the peak height of Si-methyl stretching vibration, b, were obtained. As a result of analysis by ATR-IR, the obtained modified cured product comprised a site in which the conversion rate from methyl groups into hydroxyl groups due to light irradiation was 100%. The site was a place at a position directly under the light source where the irradiation intensity was considered to be highest.

Example 5-2

The same experiments as in Example 5-1 were performed except that the all-trans form (cyclic silanol (B4)) prepared in the above (Preparation of Stereoisomers) was added to the silanol composition (isopropanol solution) made in Example 5-1, and the all-trans form ratio was 43%.

Example 5-3

The same experiments as in Example 5-1 were performed except that the all-trans form (cyclic silanol (B4)) prepared in the above (Preparation of Stereoisomers) was added to the silanol composition (isopropanol solution) made in Example 5-1, and the all-trans form ratio was 56?.

Example 5-4

The same experiments as in Example 5-1 were performed except that the all-cis form (cyclic silanol (B1)) prepared in the above (Preparation of Stereoisomers) was added to the silanol composition (isopropanol solution) made in Example 5-1, and the all-cis form form ratio was 31%.

Example 5-5

The same experiments as in Example 5-1 were performed except that the all-cis form (cyclic silanol (B1)) prepared in the above (Preparation of Stereoisomers) was added to the silanol composition (isopropanol solution) made in Example 5-1, and the all-cis form ratio was 41%.

Example 5-6

The same experiments as in Example 5-1 were performed except that the trans-trans-cis form (cyclic silanol (B3)) prepared in the above (Preparation of Stereoisomers) was added to the silanol composition (isopropanol solution) made in Example 5-1, and the trans-trans-cis form ratio was 66%.

Example 5-7

Figure 12:
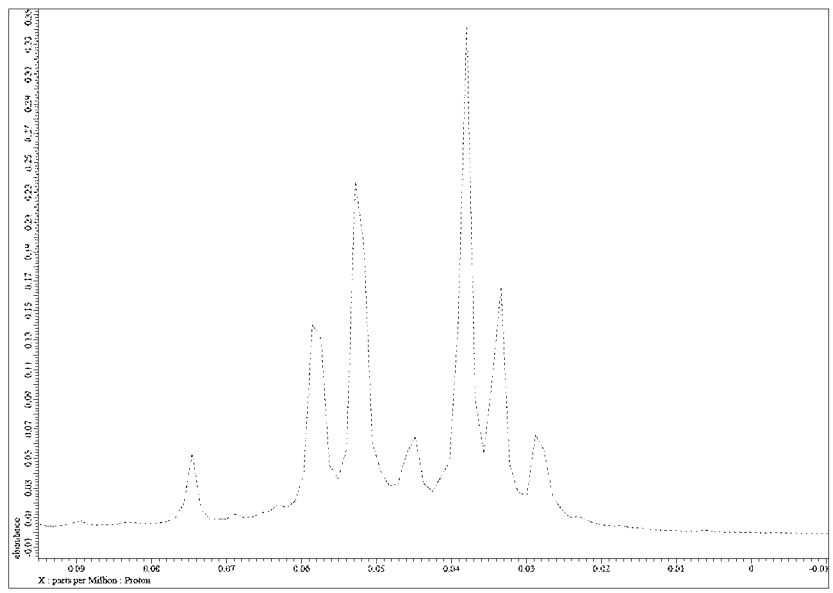
FIG. 12 is a diagram showing the $^1$H-NMR spectrum used when calculating the proportions of the stereoisomers of the silanol composition obtained in Example 5-7

The same experiments as in Example 5-1 were performed except that the recrystallization temperature in Example 5-1 was −40° C. The $^1$H-NMR spectrum is shown in FIG. 12.

Example 5-8

The same experiments as in Example 5-1 were performed except that the temperature of thermal curing in Example 5-1 was 120° C.

Example 5-9

The same experiments as in Example 5-1 were performed except that the temperature of thermal curing in Example 5-1 was 150° C.

Example 5-10

The same experiments as in Example 5-1 were performed except that the temperature of thermal curing in Example 5-1 was 180° C.

Comparative Example 5-1

The same experiments as in Example 5-1 were performed using a cured product obtained by heating at 150° C. for 2 h using JCR6122 (manufactured by Dow Corning).

Comparative Example 5-2

The same experiments as in Example 5-1 were performed using a methylsiloxane cured product obtained by heating at 180° C. for 2 h a solution obtained by mixing methyltrimethoxysilane (TOKYO CHEMICAL INDUSTRY CO., LTD.), acetic acid, water, and ethanol and then stirring the mixture at room temperature for 24 h.

Comparative Example 5-3

The same experiments as in Example 5-1 were performed using a dimethyl silicone-methylsiloxane cured product obtained by heating at 180° C. for 2 h a solution obtained by mixing methyltrimethoxysilane (TOKYO CHEMICAL INDUSTRY CO., LTD.), dimethyldimethoxysilane (TOKYO CHEMICAL INDUSTRY CO., LTD.), acetic acid water, and ethanol and then stirring the mixture at room temperature for 24 h.

Comparative Example 5-4

The same experiments as in Example 5-1 were performed using a tetraethoxysilane cured product obtained by heating at 180° C. for 2 h a solution obtained by mixing tetraethoxysilane (TOKYO CHEMICAL INDUSTRY CO., LTD.), acetic acid water, and ethanol and then stirring the mixture at room temperature for 1 h.

The physical properties and evaluation results of the silanol compositions and the cured products obtained in the Examples and the Comparative Examples are shown in Table 9 and Table 10.

TABLE 9

|  |  | Example 5-1 | Example 5-2 | Example 5-3 | Example 5-4 | Example 5-5 | Example 5-6 |
|---|---|---|---|---|---|---|---|
| Cured product |  | D4OH cured product | D4OH cured product | D4OH cured product | D4OH cured product | D4OH cured product | D4OH cured product |
| IR parameters | Si methyl stretching/SiOSi stretching area ratio of cured product | 0.05 | 0.05 | 0.05 | 0.05 | 0.05 | 0.05 |
|  | Si methyl stretching/SiOSi stretching area ratio of modified cured product | 0 | — | — | — | — | — |
|  | SiOH stretching/SiOSi stretching area ratio of cured product | 0.14 | 0.15 | 0.15 | 0.14 | 0.14 | 0.15 |
|  | SiOH stretching/SiOSi stretching area ratio of modified cured product | 0.277 | 0.217 | 0.177 | 0.206 | 0.202 | 0.277 |
|  | Peak wave number of SiOH stretching vibration | ○(950.4) | ○(944.5) | ○(942.7) | ○(943.9) | ○(945.7) | ○(942.0) |
|  | Peak height of SiOH stretching vibration, a | 0.196 | 0.285 | 0.248 | 0.234 | 0.371 | 0.316 |
|  | Peak height of Si methyl stretching vibration, b | 0 | 0 | 0 | 0 | 0 | 0 |
|  | $0.1*a + b$ | ○(0.020) | ○(0.028) | ○(0.025) | ○(0.023) | ○(0.037) | ○(0.032) |
| Raman spectrum |  | ○(490) | — | — | — | — | — |
| Hardness |  | ○(2) | — | — | — | — | — |
| Crack resistance |  | 9/10 | 7/10 | 7/10 | 5/10 | 5/10 | 7/10 |
| Adhesive force |  | Adhered | Adhered | Adhered | Adhered | Adhered | Adhered |
|  |  | Example 5-7 | Example 5-8 | Example 5-9 | Example 5-10 |
| Cured product |  | D4OH cured product | D4OH cured product | D4OH cured product | D4OH cured product |
| IR parameters | Si methyl stretching/SiOSi stretching area ratio of cured product | 0.05 | 0.05 | 0.05 | 0.05 |
|  | Si methyl stretching/SiOSi stretching area ratio of modified cured product | — | — | — | — |
|  | SiOH stretching/SiOSi stretching area ratio of cured product | 0.14 | 0.8 | 0.7 | 0.5 |
|  | SiOH stretching/SiOSi stretching area ratio of modified cured product | — | — | — | — |
|  | Peak wave number of SiOH stretching vibration | ○(951.4) | ○(949.5) | ○(958.2) | ○(957.1) |
|  | Peak height of SiOH stretching vibration, a | 0.18 | 0.172 | 0.0952 | 0.149 |
|  | Peak height of Si methyl stretching vibration, b | 0 | 0 | 0 | 0 |
|  | $0.1*a + b$ | ○(0.018) | ○(0.017) | ○(0.0095) | ○(0.015) |
| Raman spectrum |  | — | — | — | — |
| Hardness |  | — | — | — | — |
| Crack resistance |  | 10/10 | 9/10 | 10/10 | 9/10 |
| Adhesive force |  | Adhered | Adhered | Adhered | Adhered |

TABLE 10

| | | Comparative Example 5-1 | Comparative Example 5-2 | Comparative Example 5-3 | Comparative Example 5-4 |
|---|---|---|---|---|---|
| Cured product | | Dimethyl silicone cured product | Methylsiloxane random cured product | Dimethyl silicone + methylsiloxane random cured product | Tetraethoxysilane polymer |
| IR parameters | Si methyl stretching/SiOSi stretching area ratio of cured product | 0.1 | 0.047 | 0.057 | — |
| | Si methyl stretching/SiOSi stretching area ratio of modified cured product | 0.0019 | 0 | 0.00094 | — |
| | SiOH stretching/SiOSi stretching area ratio of cured product | 0 | 0.032 | 0.001 | — |
| | SiOH stretching/SiOSi stretching area ratio of modified cured product | 0.116 | 0.122 | 0.172 | 0.081 |
| | Wave number peak of SiOH stretching vibration | ○(946.6) | X(938.6) | ○(940.1) | X(967.1) |
| | Peak height of SiOH stretching vibration, a | 0.157 | 0.203 | 0.255 | 0.127 |
| | Peak height of Si methyl stretching vibration, b | 0.043 | 0 | 0.038 | 0 |
| | 0.1*a + b | X(0.059) | ○(0.020) | X(0.064) | ○(0.013) |
| Raman spectrum | | X(520) | ○(490) | — | — |
| Hardness | | X(0.9) | ○(2) | — | — |
| Crack resistance | | 0/10 | 0/10 | 0/10 | 0/10 |
| Adhesive force | | Adhered | X | X | X |

This application is based on Japanese Patent Application No. 2019-28764, Japanese Patent Application No. 2019-28667, Japanese Patent Application No. 2019-28719, and Japanese Patent Application No. 2019-28637 filed on Feb. 20, 2019, the contents of which are incorporated herein by reference.

INDUSTRIAL APPLICABILITY

The cured product obtained by curing a silanol composition according to the present invention has industrial applicability in the protection, sealing, and adhesion of semiconductor devices such as light-emitting diode devices, and the change or adjustment of the wavelength of light emitted from light-emitting diode devices, and in the fields of lens and the like. Further, the cured product of the present invention has industrial applicability in the fields of various optical materials such as lens materials, materials for optical devices and optical components, and display materials, insulating materials for electronic devices and electronic components, coating materials, and the like.

The invention claimed is:

1. A cured product of a silanol composition comprising a cyclic silanol containing a silanol group and having a cyclic structure comprised of repeating siloxane units, and a dehydration condensation product thereof, wherein
an area ratio of a peak derived from SiO—H stretching observed at 2600 to 3800 cm$^{-1}$ to an area of a peak derived from Si—O—Si stretching observed at 960 to 1220 cm$^{-1}$ (SiO—H stretching/Si—O—Si stretching area ratio) is 0.01 or more in an IR spectrum.

2. The cured product according to claim 1, wherein the SiO—H stretching/Si—O—Si stretching area ratio is 1.0 or less.

3. The cured product according to claim 1, having a peak top in a range of 470 cm$^{-1}$ or more and 600 cm$^{-1}$ or less in a Raman spectrum.

4. The cured product according to claim 1, having a hardness of 0.01 GPa or more and 1 GPa or less.

5. The cured product according to claim 4, having a Young's modulus of 0.1 GPa or more.

6. The cured product according to claim 5, having a Young's modulus of 30 GPa or less.

7. The cured product according to claim 1, wherein the cured product is a film having a film thickness of 0.01 μm or more and 2 μm or less.

8. The cured product according to claim 1, wherein the cyclic silanol and dehydration condensation product thereof are a cyclic silanol (A1) represented by the following formula (1) and a dehydration condensation product thereof (A2),

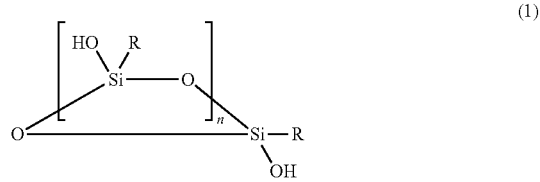

(1)

wherein each R is independently a fluorine atom, an aryl group, a vinyl group, an allyl group, a fluorine-substituted linear or branched alkyl group having 1 to 4 carbon atoms, or an unsubstituted linear or branched alkyl group having 1 to 4 carbon atoms, and n is an integer of 2 to 10.

9. The cured product according to claim 8, wherein the cyclic silanol (A1) represented by the formula (1) and the dehydration condensation product thereof (A2) are a cyclic silanol (A10) represented by the following formula (10) and a dehydration condensation product thereof (A20), (10)

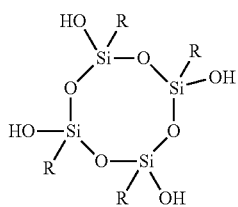

wherein R has the same meaning as R in the formula (1).

10. The cured product according to claim 9, wherein the cyclic silanol (A10) contains cyclic silanols (B1) to (B4) represented by the following formulas (2) to (5):

(B1)

(2)

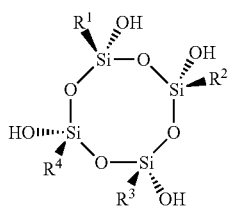

(B2)

(3)

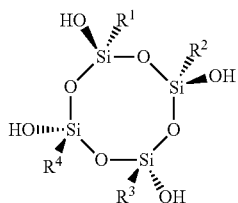

(B3)

(4)

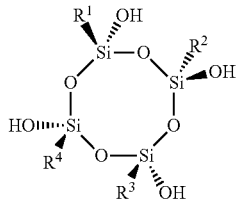

(B4)

(5)

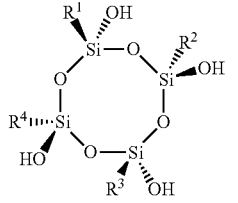

wherein $R^1$ to $R^4$ are each independently a fluorine atom, an aryl group, a vinyl group, an allyl group, a fluorine-substituted linear or branched alkyl group having 1 to 4 carbon atoms, or an unsubstituted linear or branched alkyl group having 1 to 4 carbon atoms, and
(B2) comprises greater than 0 and up to 20 mol % of the total number of moles of (B1) to (B4).

11. The cured product according to claim 8, wherein an area of the dehydration condensation product (A2) is more than 0% and 50% or less based on a total area of the cyclic silanol (A1) and the dehydration condensation product (A2) in gel permeation chromatography measurement.

12. The cured product according to claim 1, wherein a proportion of a transition metal in the silanol composition is less than 1 ppm by mass.

13. The cured product according to claim 1, wherein the silanol composition comprises a solvent.

14. The cured product according to claim 1, used for an adhesive.

15. A modified cured product obtained by irradiating the cured product according to claim 1 with light.

16. The modified cured product according to claim 15, wherein the a cyclic silanol and dehydration condensation product thereof are a cyclicsilanol (A1) represented by the formula (1)

(1)

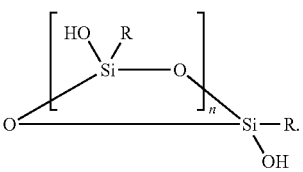

wherein each R is independently a fluorine atom, an aryl group, a vinyl group, an allyl group, a fluorine-substituted linear or branched alkyl group having 1 to 4 carbon atoms, or an unsubstituted linear or branched alkyl group having 1 to 4 carbon atoms, and n is an integer of 2 to 10;
and the dehydration condensation product thereof (A2), and the modified cured product comprising a site in which a conversion rate of groups represented by R in the formula (1) into hydroxyl groups is 100%.

17. A method for curing a silanol composition, comprising a step of thermally curing under a temperature condition of 25 to 200° C. a silanol composition comprising a cyclic silanol containing a silanol group and having a cyclic structure comprised of repeating siloxane units, and a dehydration condensation product thereof to obtain a cured product, wherein an area ratio of a peak derived from SiO—H stretching observed at 2600 to 3800 cm$^{-1}$ to an area of a peak derived from Si—O—Si stretching observed at 960 to 1220 cm$^{-1}$ (SiO—H stretching/Si—O—Si stretching area ratio) is 0.01 or more in an IR spectrum.

18. The method according to claim 17, wherein the silanol composition is thermally cured for 10 min to 48 h in the thermal curing step.

19. A cured product comprising a dehydration condensation product of a silanol comprised of repeating siloxane units, wherein
a peak wave number of Si—OH stretching vibration is 940 cm$^{-1}$ or more and 960 cm$^{-1}$ or less in an IR spectrum, and an amount of functional groups defined by "0.1*a+b" (a and b are respectively a peak height of the Si—OH stretching vibration observed at 920±50 cm$^{-1}$ and a peak height of Si-methyl stretching vibration observed at 1270±10 cm$^{-1}$ when a peak height of Si—O—Si stretching vibration at 1030±40 cm$^{-1}$ is defined as 1) is 0 or more and 0.05 or less.

20. The cured product according to claim 19, wherein the peak wave number of the Si—OH stretching vibration is 940 cm$^{-1}$ or more and 950 cm$^{-1}$ or less.

21. The cured product according to claim 19, wherein the amount of functional groups defined by "0.1*a+b" is 0 or more and 0.04 or less.

22. The cured product according to claim 19, having a peak at 470 cm$^{-1}$ or more and 510 cm$^{-1}$ or less in a Raman spectrum.

23. The cured product according to claim 19, having a peak at 480 cm$^{-1}$ or more and 500 cm$^{-1}$ or less in a Raman spectrum.

24. The cured product according to claim 19, having a hardness of 1.5 GPa or more.

25. The cured product according to claim 19, having a hardness of 2.0 GPa or more.

* * * * *